(12) United States Patent
Savage et al.

(10) Patent No.: US 8,201,494 B1
(45) Date of Patent: Jun. 19, 2012

(54) HIGH PRODUCTION NUT CRACKING APPARATUS

(75) Inventors: Basil W. Savage, Madill, OK (US);
Steven W. Savage, Madill, OK (US)

(73) Assignee: Savage Equipment Incorporated, Madill, OK (US)

(*) Notice: Subject to any disclaimer, the term of this patent is extended or adjusted under 35 U.S.C. 154(b) by 782 days.

(21) Appl. No.: 11/809,763

(22) Filed: Jun. 1, 2007

(51) Int. Cl.
*A23N 5/00* (2006.01)
(52) U.S. Cl. ............................... 99/571; 99/574; 99/581
(58) Field of Classification Search .................... 99/571, 99/574, 580, 568, 581, 582, 577, 578, 567; 426/481, 482, 483; 198/622; 30/120.1, 120.2; *A23N 5/00, 5/02; A23L 1/00*
See application file for complete search history.

(56) References Cited

U.S. PATENT DOCUMENTS

| | | | |
|---|---|---|---|
| 493,887 A | 3/1893 | Gamble | |
| 505,002 A | 9/1893 | Read | |
| 1,703,989 A * | 3/1929 | Colecliffe et al. | 99/578 |
| 1,802,294 A * | 4/1931 | Walker | 99/576 |
| 2,083,968 A | 6/1937 | Walling | |
| 2,138,473 A * | 11/1938 | Fontana | 99/572 |
| 2,954,810 A * | 10/1960 | MacCloygston Bond | 99/574 |
| 3,249,219 A * | 5/1966 | Sanfilippo et al. | 209/2 |
| 3,561,513 A | 2/1971 | Lindsey | |
| 3,871,275 A | 3/1975 | Quantz | |
| 3,968,629 A * | 7/1976 | Gidewall et al. | 53/374.8 |
| 4,052,992 A | 10/1977 | Taylor | |
| 4,144,805 A | 3/1979 | Cacho | |
| 4,201,126 A * | 5/1980 | Evans | 99/574 |
| 4,332,827 A | 6/1982 | Quantz | |
| 4,418,617 A | 12/1983 | Quantz | |
| 4,441,414 A | 4/1984 | Quantz | |
| 4,688,281 A | 8/1987 | Lantz | |
| 5,247,879 A | 9/1993 | Frederiksen et al. | |
| 5,296,248 A | 3/1994 | Huang | |
| 5,623,867 A | 4/1997 | Quantz | |
| 5,879,734 A | 3/1999 | Broyles | |
| 6,135,020 A | 10/2000 | Broyles | |
| 6,182,562 B1 | 2/2001 | Quantz et al. | |
| 6,205,915 B1 | 3/2001 | Quantz | |
| 6,209,448 B1 | 4/2001 | Hagen | |
| D442,189 S | 5/2001 | Quantz et al. | |
| D442,609 S | 5/2001 | Quantz et al. | |
| 6,270,824 B1 | 8/2001 | Quantz | |
| 6,360,787 B1 * | 3/2002 | Williamson | 141/74 |
| 6,584,890 B1 | 7/2003 | Quantz et al. | |
| 6,588,328 B1 | 7/2003 | Quantz et al. | |
| D490,445 S | 5/2004 | Quantz et al. | |
| 6,766,732 B1 | 7/2004 | Quantz et al. | |
| 6,772,680 B1 * | 8/2004 | Quantz et al. | 99/571 |
| 6,851,353 B1 | 2/2005 | Quantz et al. | |
| D509,517 S | 9/2005 | Quantz et al. | |
| D519,529 S | 4/2006 | Quantz et al. | |
| 7,028,608 B1 | 4/2006 | Quantz et al. | |
| 7,194,950 B1 | 3/2007 | Quantz et al. | |
| 7,197,977 B2 | 4/2007 | Quantz et al. | |
| 7,673,561 B1 * | 3/2010 | Savage et al. | 99/571 |
| 2007/0062381 A1 * | 3/2007 | Quantz et al. | 99/568 |

* cited by examiner

*Primary Examiner* — Reginald L Alexander
(74) *Attorney, Agent, or Firm* — McAfee & Taft

(57) ABSTRACT

A nut cracking apparatus includes a rotatable turret mounted to a frame. An endless conveyor delivers nuts to a pickup point at which nut cracking units engage nuts carried by the endless conveyor. The endless conveyor has a generally horizontal carrying portion for carrying nuts from the hopper to the pickup point.

5 Claims, 25 Drawing Sheets

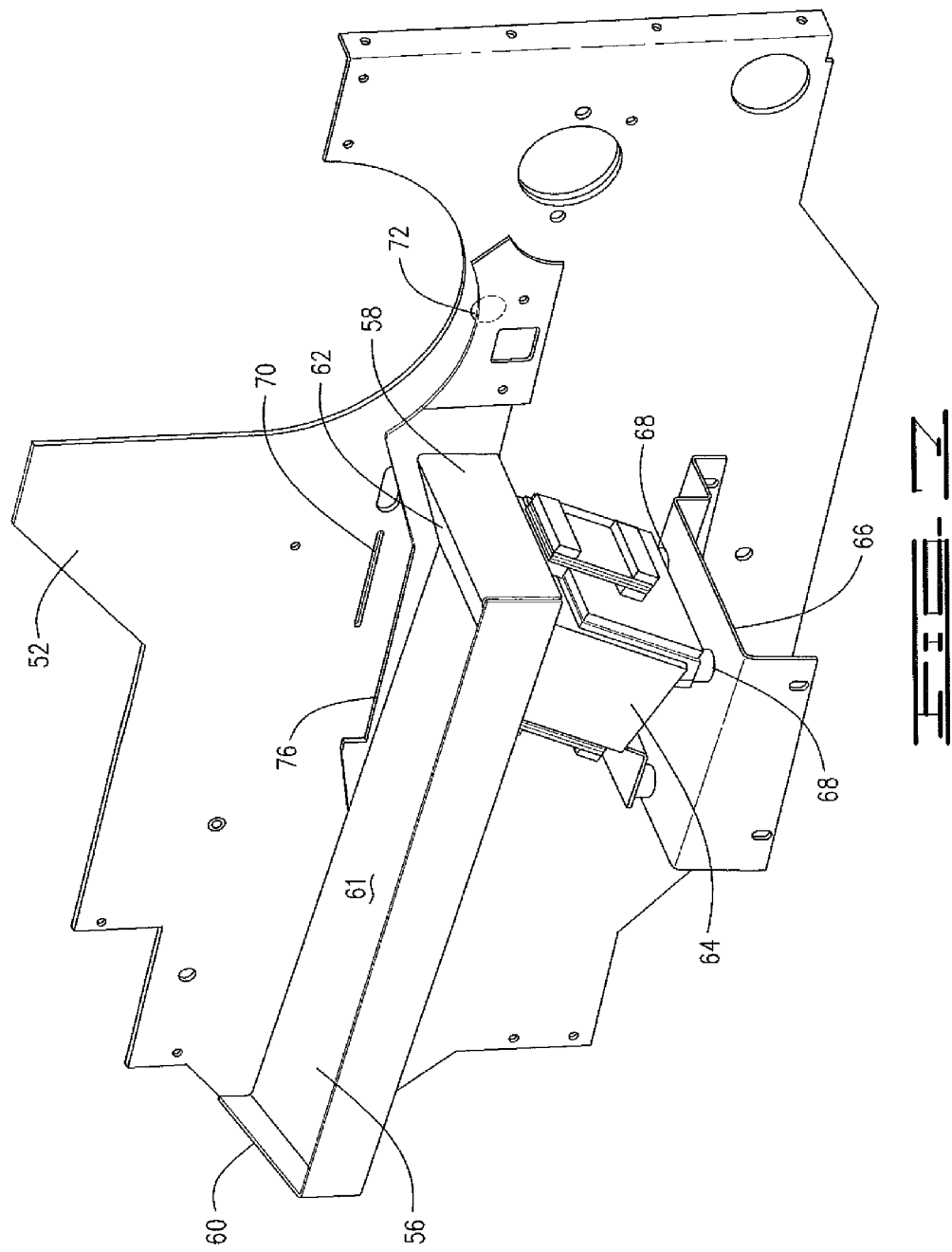

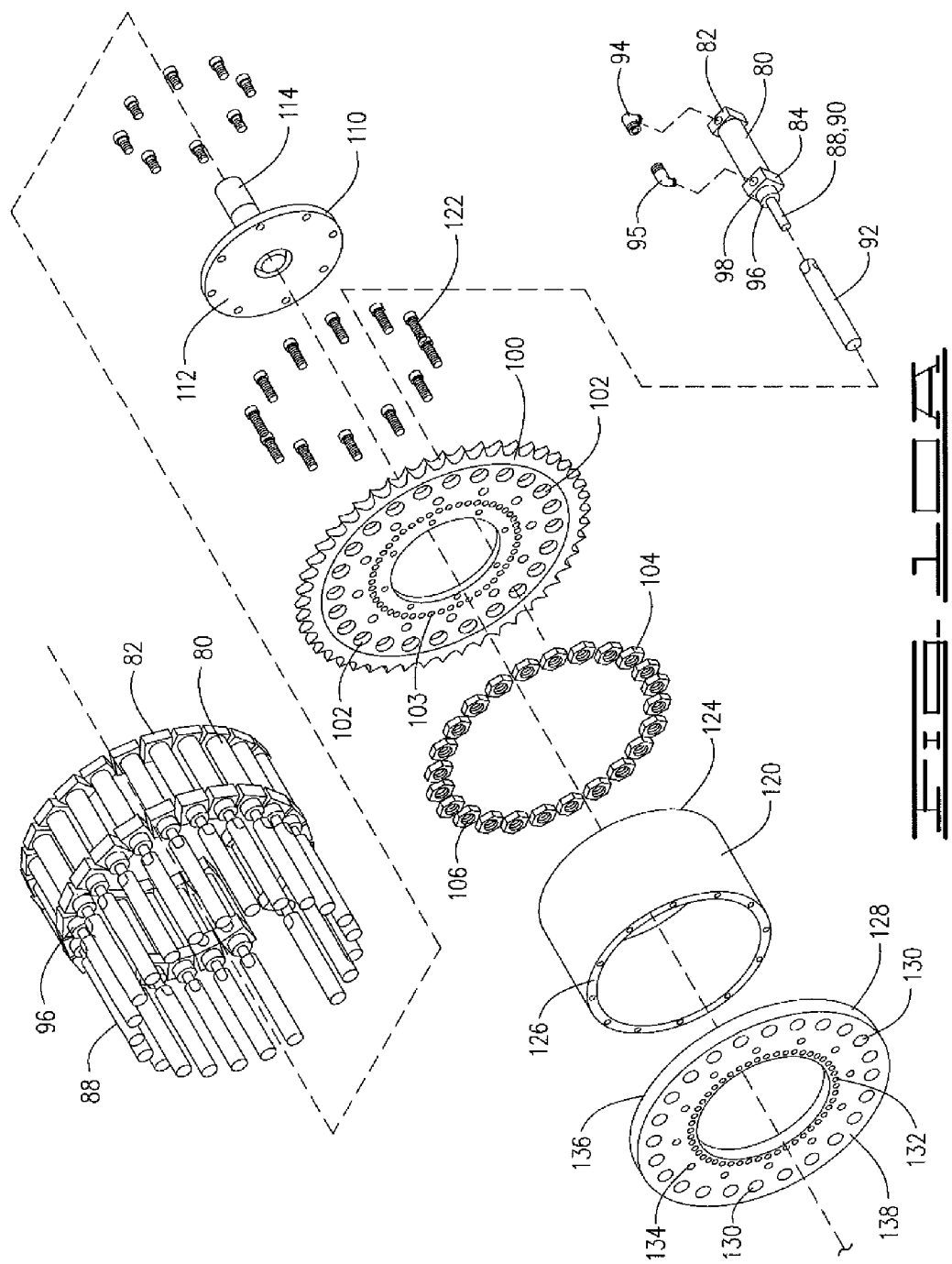

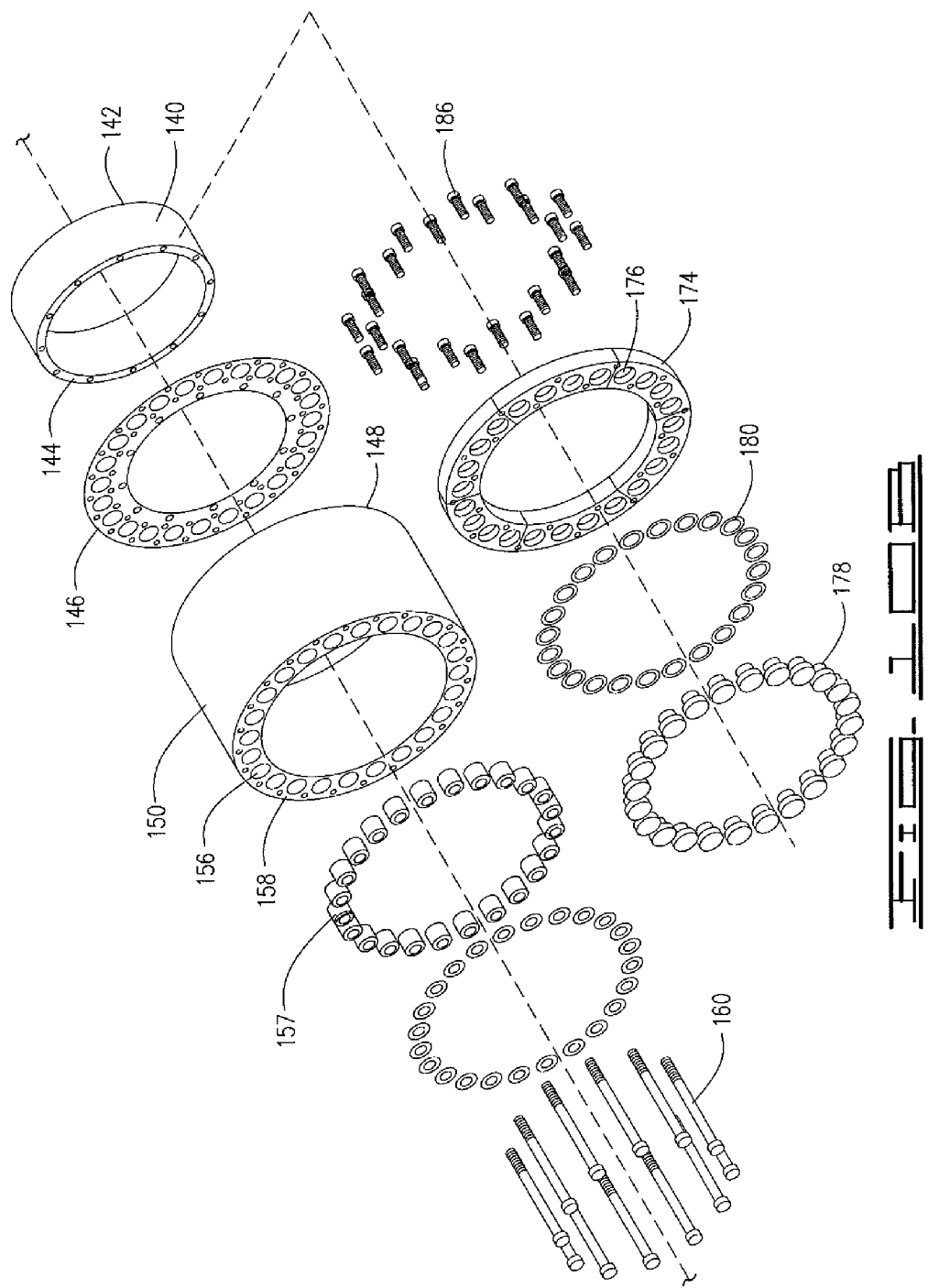

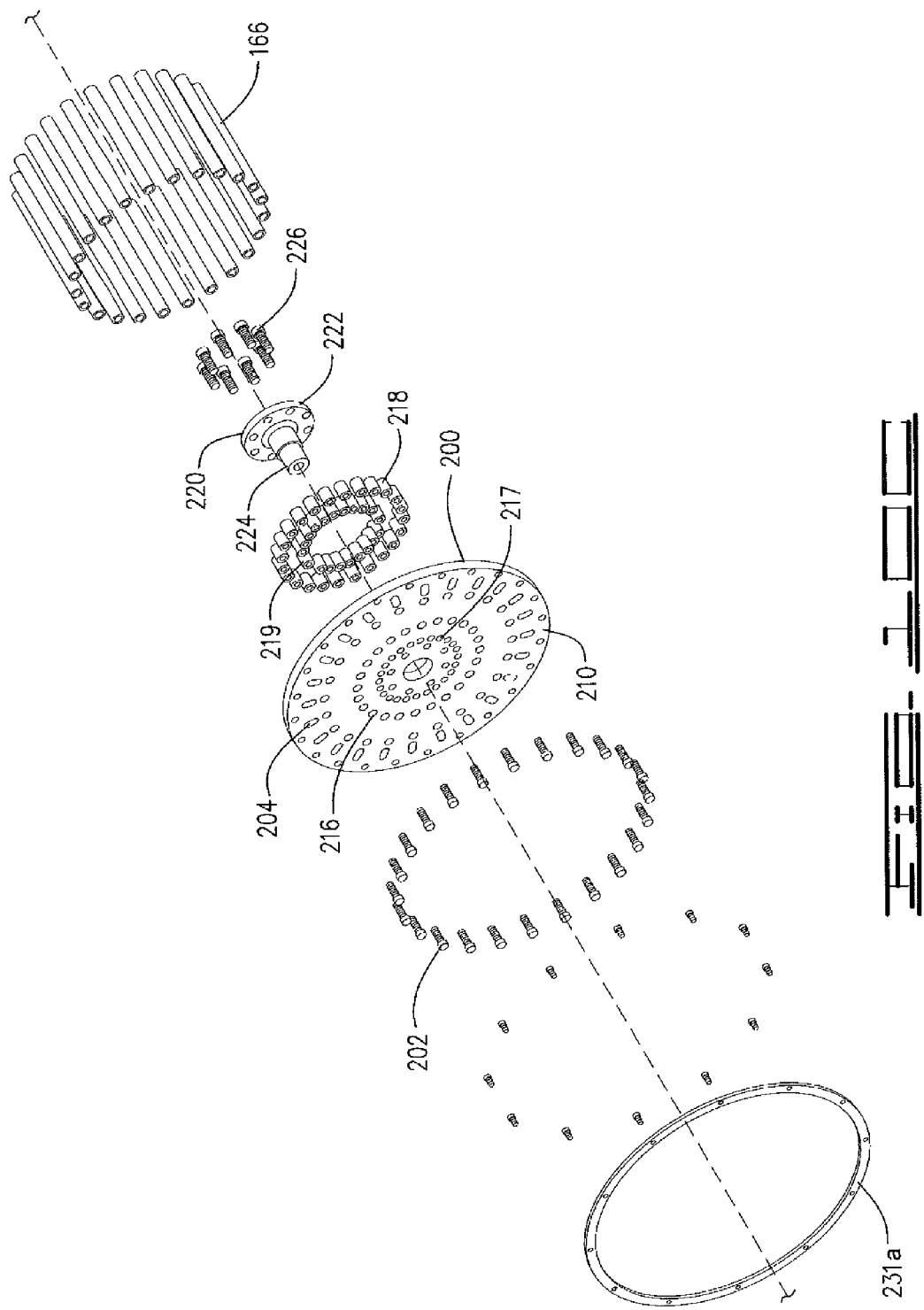

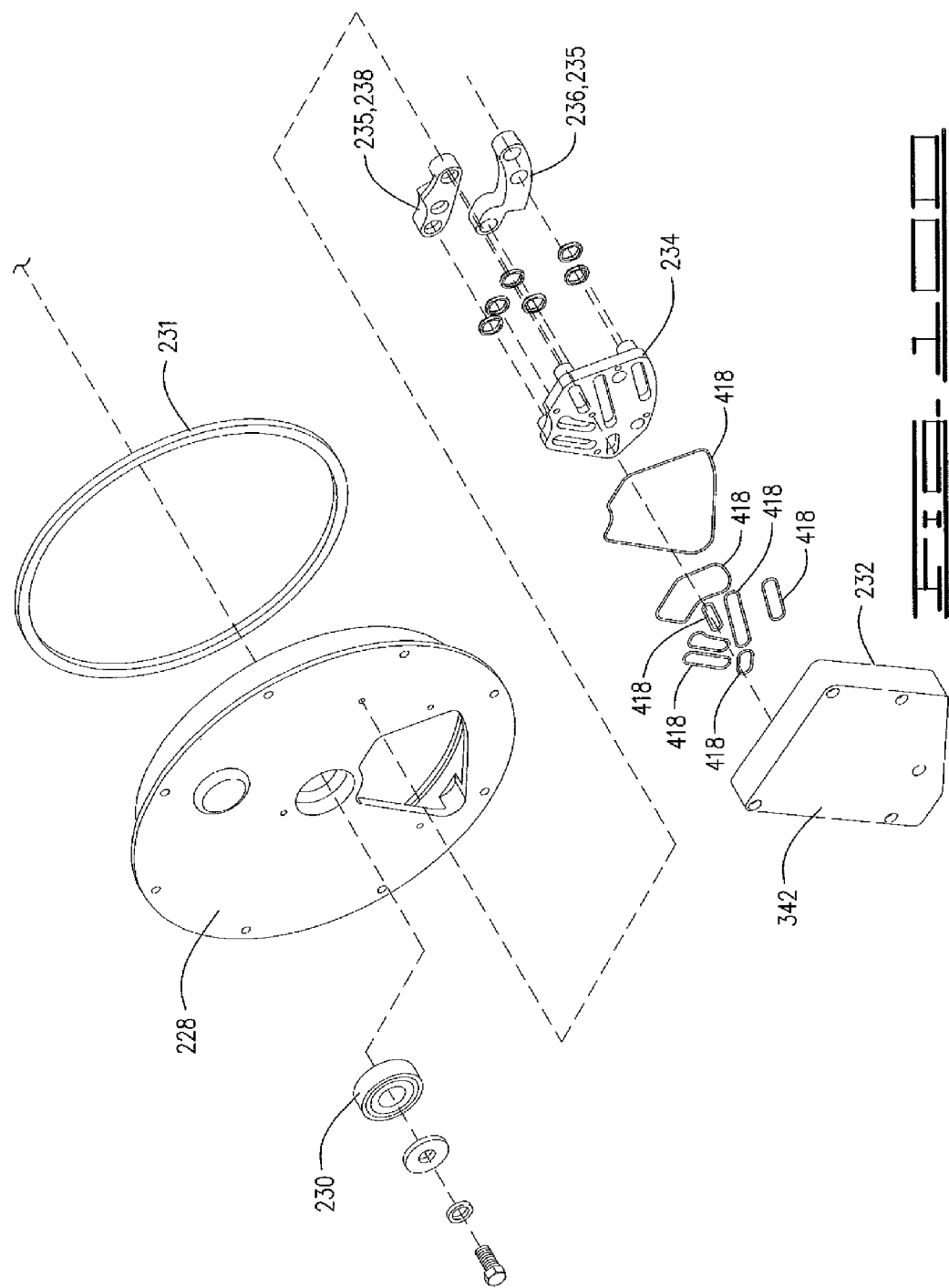

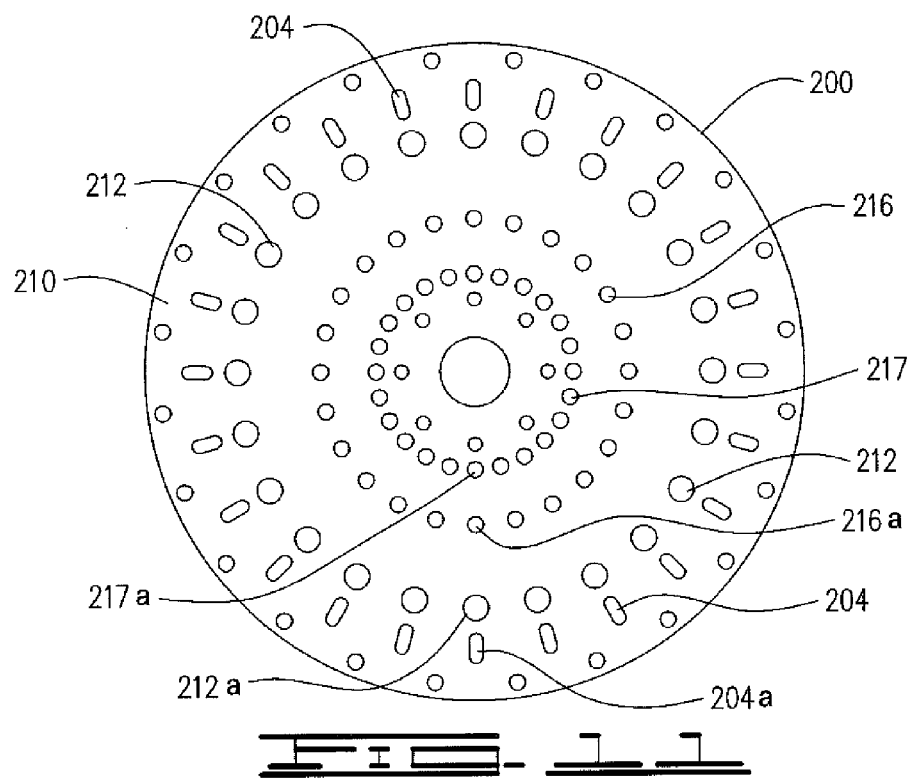
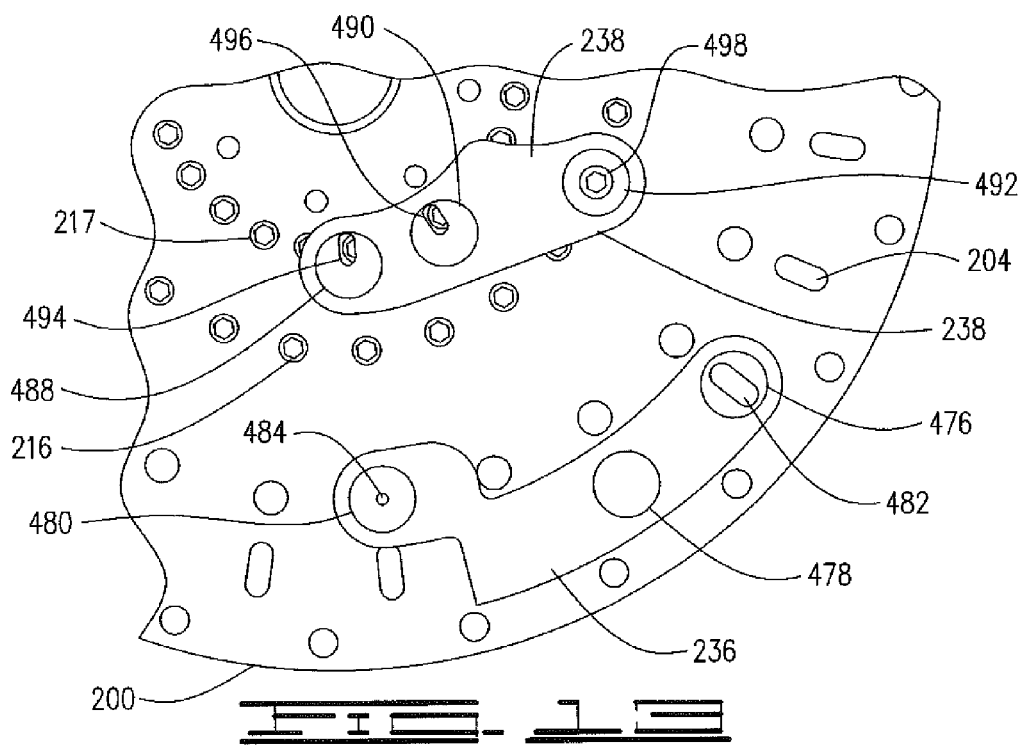

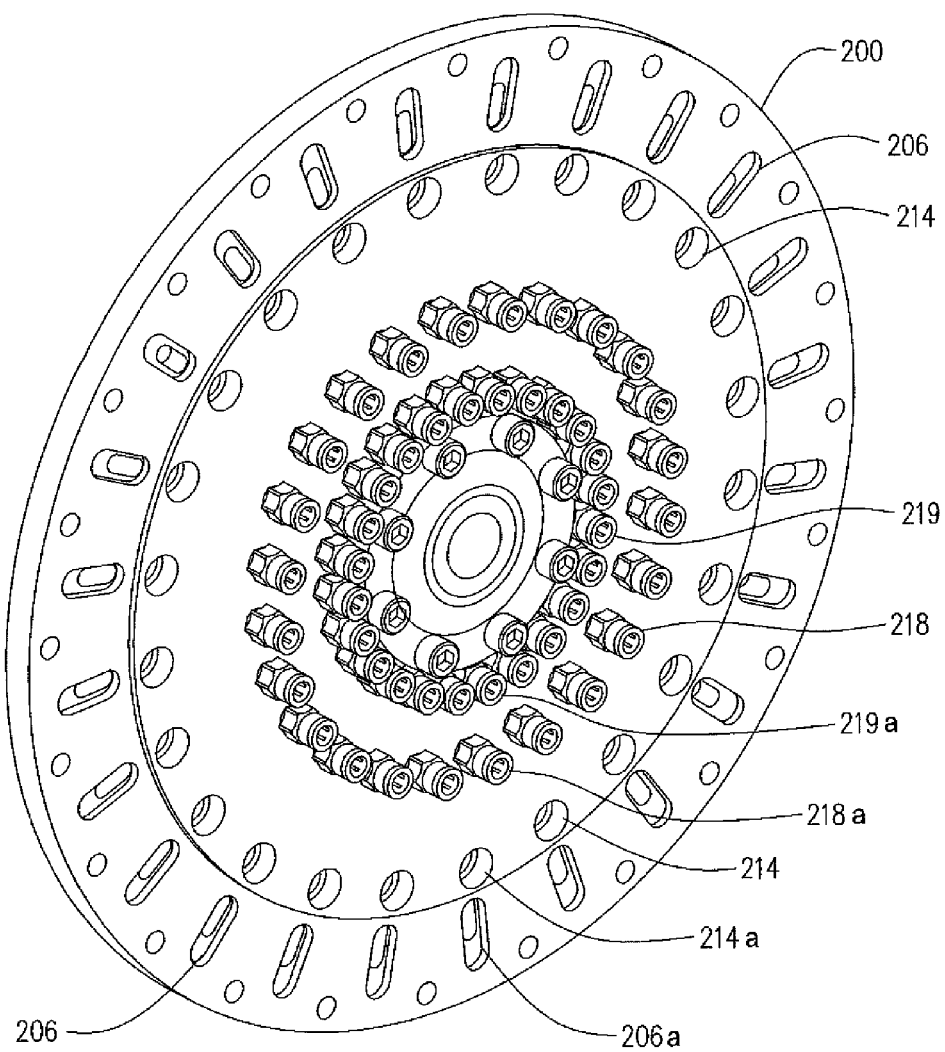

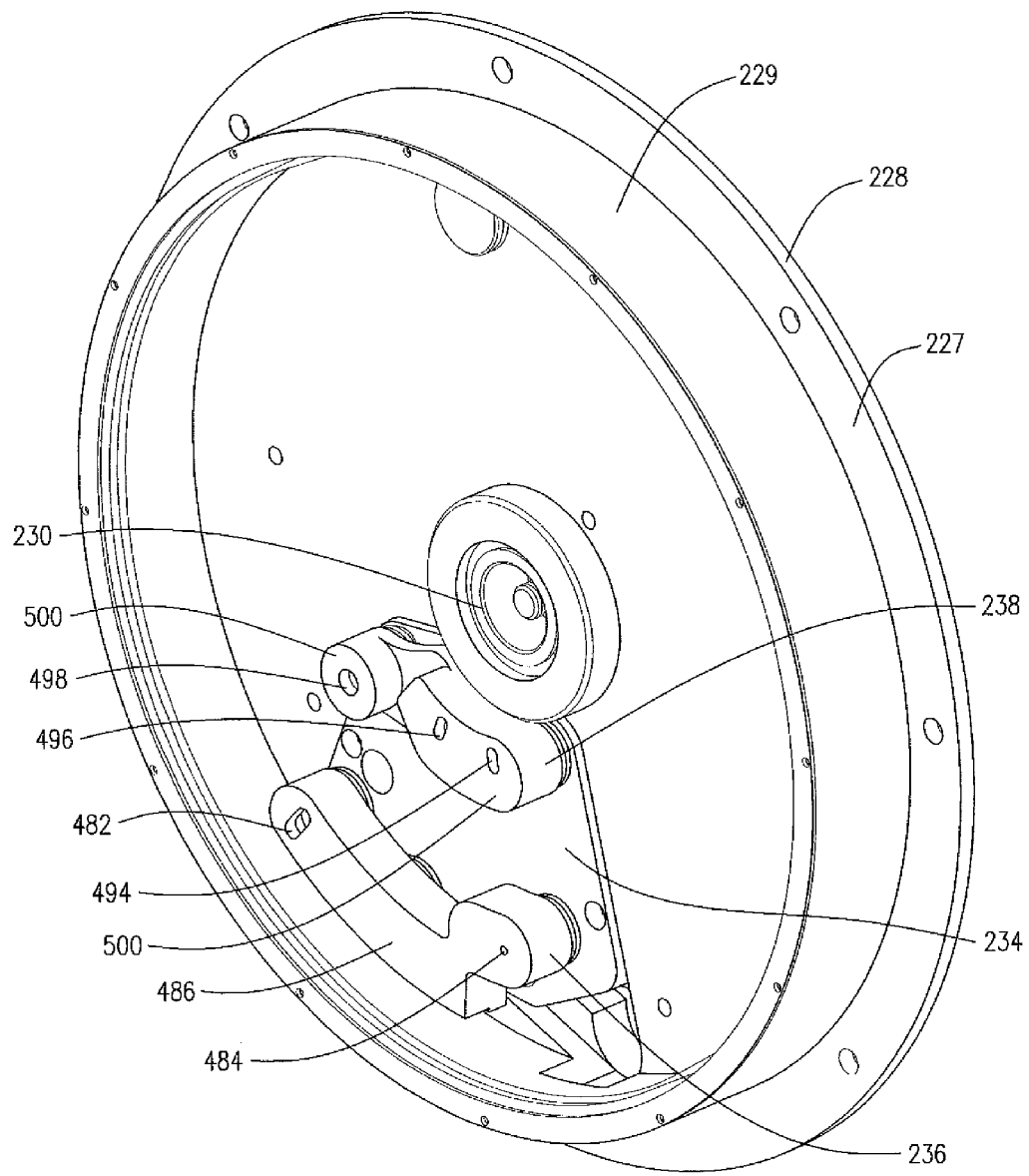

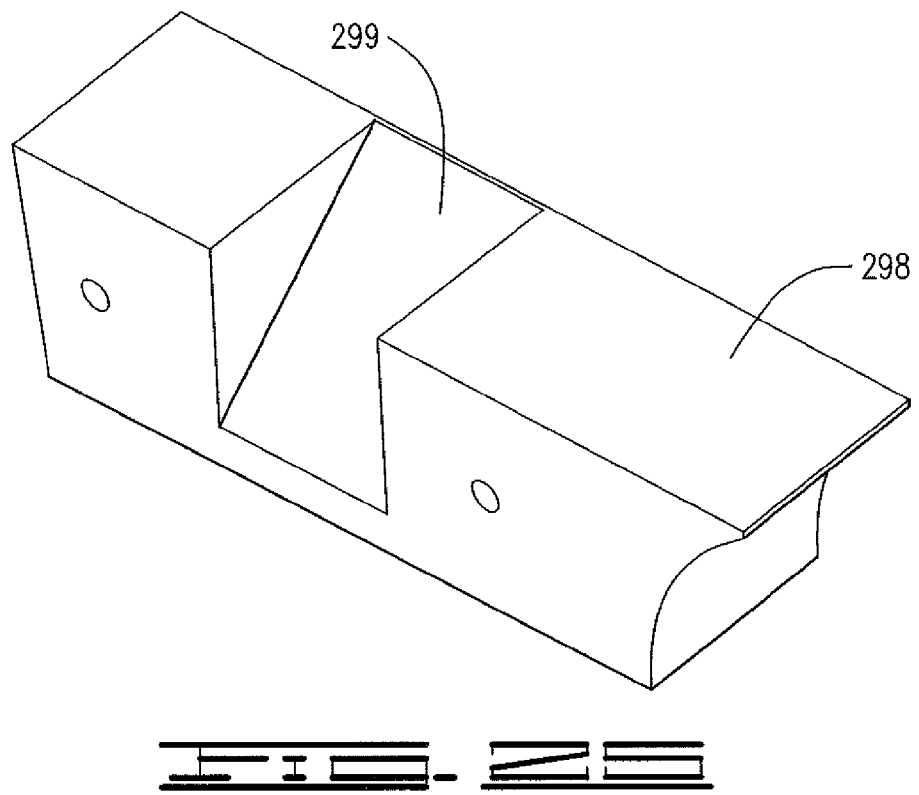
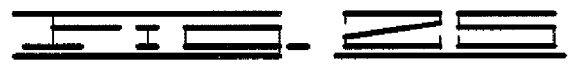
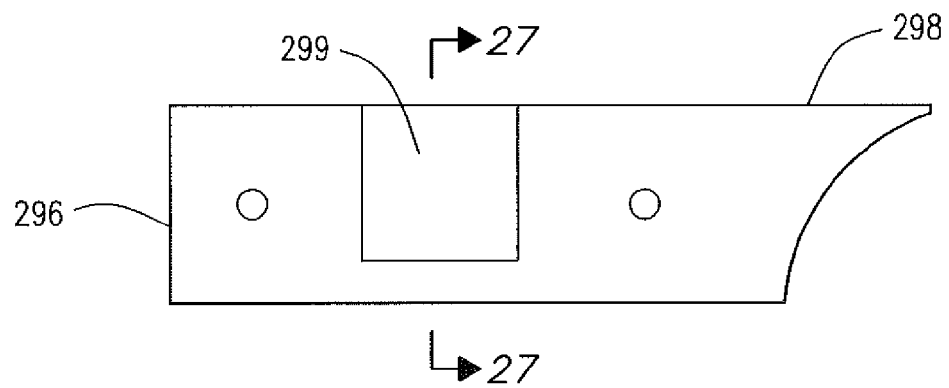

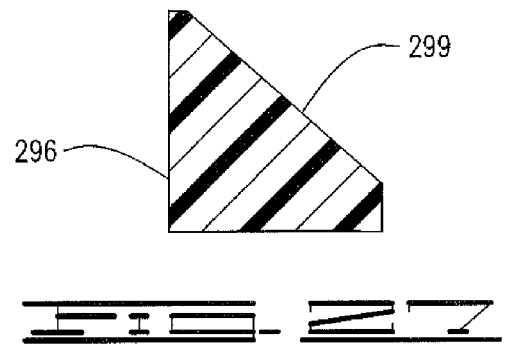
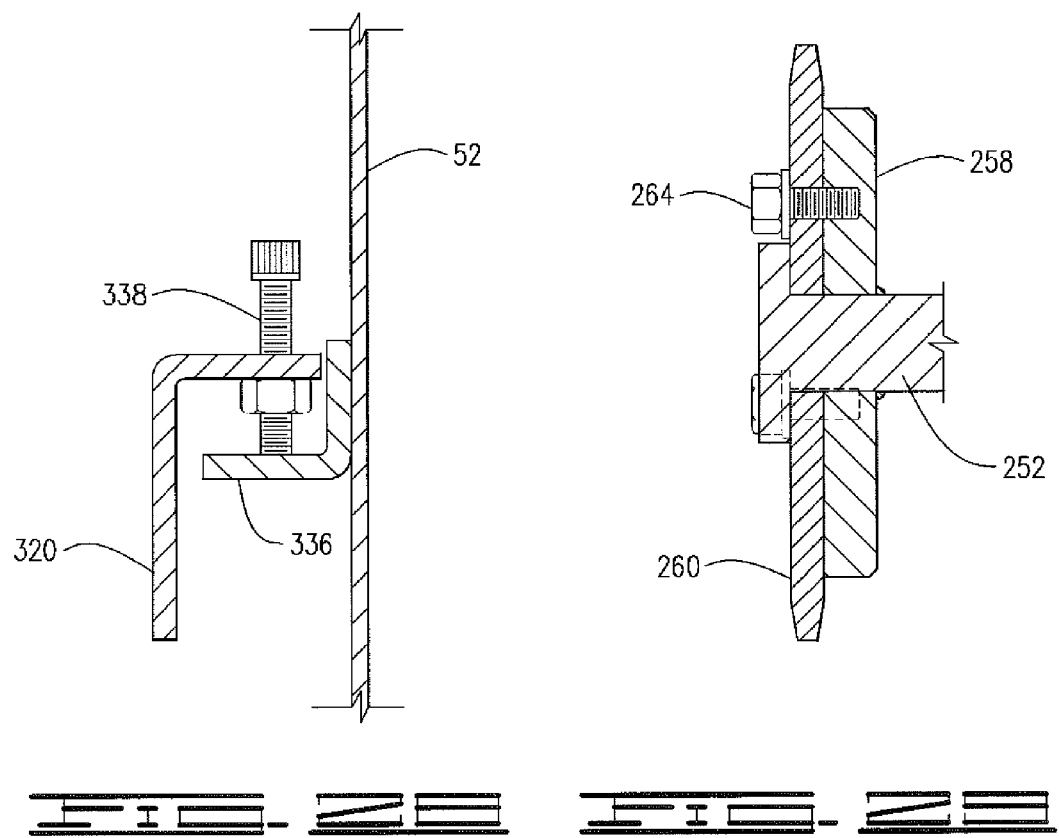

HIGH PRODUCTION NUT CRACKING APPARATUS

BACKGROUND

There are a number of prior U.S. patents that disclose nut-cracking apparatus including U.S. Pat. Nos. 6,588,328, 6,584,890, 6,270,824, 6,205,915, 6,182,562, 5,623,867, 4,441,414, 4,418,617, 4,332,827. Each of the aforementioned patents discloses an endless feed conveyor that delivers nuts from a hopper or bin to a rotating turret. The rotating turret includes nut-cracking units that engage the nuts to be cracked at a pickup point to remove the nuts from the endless conveyor. The feed conveyor generally includes a feed chain disposed about a plurality of sprockets. A plurality of nut-carrying, or nut-transporting units on the feed chain deliver the nuts to be cracked from the hopper to the pickup point. Methods and apparatus disclosed in the aforementioned patents include pneumatic systems associated with the nut-cracking units. The nut-cracking units crack the nuts, and in many of the devices loose shell fragments are drawn off by a vacuum line and the cracked nut is delivered to a separate discharge chute. Although there are a number of prior art nut-cracking apparatus, there is still a need for improved methods and apparatus for high production nut-cracking. Improved apparatus as disclosed in U.S. patent application Ser. No. 10/718,378, and U.S. patent application Ser. No. 11/025,445, both assigned to the assignee of the current invention, and incorporated herein by reference. There is, however, a continuing need for nut-cracking apparatus that are compact, and effectively and efficiently crack nuts at high production rates with less wear on the apparatus.

SUMMARY

A nut cracking apparatus comprises a hopper defined by a frame for holding a supply of nuts. A rotatable turret is mounted to the frame. The rotatable turret has a plurality of nut cracking units for engaging nuts at a pickup point. An endless conveyor will carry nuts from a delivery point in the hopper to the pickup point at which the nut is engaged by a nut cracking unit. The endless conveyor contains a plurality of nut pockets for carrying the nuts from the hopper to the pickup point. The endless conveyor is horizontal from the point at which a nut enters a nut pocket to the pickup point. The endless conveyor may be comprised of a plurality of nut pocket segments each of which has a forward and rear portion. Each nut pocket segment is spaced from the adjacent nut pocket segment.

A vacuum system may be utilized to pull air through the space between the nut pocket segments to thereby align the nut to be engaged by a nut cracking unit and to hold the nut in place in a nut pocket. A vibrator for vibrating a hopper floor will urge nuts in the hopper towards the endless conveyor.

The nut cracking units in the rotatable turret comprise an air cylinder rod with a cylinder extending therefrom and an opposed crack die. Nuts will be held between the cylinder rod and the crack die and will be cracked when a shuttle impacts the crack valve. Cracked nuts will be dropped onto a discharge chute.

BRIEF DESCRIPTION OF THE DRAWINGS

FIG. 6 is a view from the left with certain details removed to show the endless conveyor.
FIG. 7 is a view of the center plate and hopper floor.
FIGS. 10A-10D show an exploded view of a turret assembly.
FIG. 11 is a view of the left side of the valve plate.
FIG. 12 is a right side perspective view of a valve plate.
FIG. 13 is a partial left side view of a valve plate with valves engaging the valve plate.
FIG. 14 is a right side perspective view of a valve base plate with a valve cover attached.
FIG. 25 is a perspective view of a fragment collector.
FIG. 26 is a side view of a fragment collector.
FIG. 27 is a cross section from line 27-27 of FIG. 26.
FIG. 28 is a cross section showing a deflector attachment
FIG. 29 is a cross section of the forward sprocket and sprocket fitting.

DETAILED DESCRIPTION OF EMBODIMENTS

Figure 1:
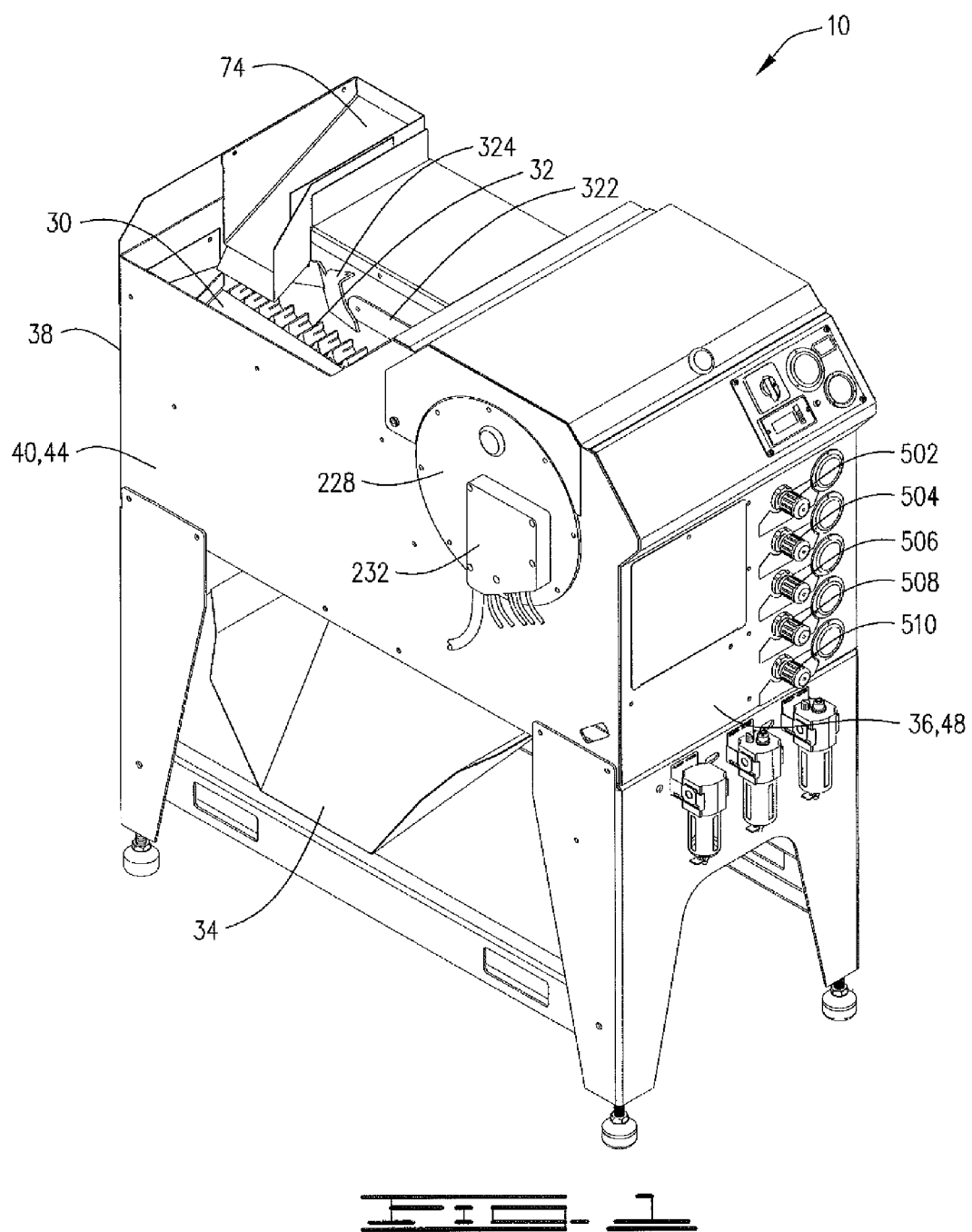
FIG. 1 is a perspective view of a nut cracking apparatus.

Referring to FIG. 1 a nut cracking apparatus 10, which is a high production nut cracking apparatus 10 is shown. High production nut cracking apparatus 10 comprises a frame 15 with a rotatable turret 20 mounted thereto. Rotatable turret 20 comprises a plurality of cracking units 25. Frame 15 defines a hopper 30 and as shown in FIG. 6 has an endless conveyor 32 mounted thereto.

In operation, rotatable turret 20 is rotated by a motor and endless conveyor 32 will deliver nuts, such as for example pecans, from hopper 30 to a point at which they are engaged by cracking units 25. The nuts, after initial engagement by a cracking unit 25, are cracked and dropped onto a discharge chute 34. Rotatable turret 20 preferably has twenty-four cracking units 25 and rotates such that up to as many as 1400 nuts per minute may be cracked. The operation of nut cracking apparatus 10 is described in further detail below.

Nut cracking apparatus 10 has a front 36, rear 38 and left and right sides 40 and 42, respectively. Frame 15 may comprise left side plate 44, rear plate 46, front plate 48 and right side plate 50. It is understood that the plates may be comprised of one or several pieces fastened together by means known in the art such as fasteners and/or welding.

Frame 15 has a center or divider plate 52 which may be attached to front and rear plates 48 and 46. The view shown in FIG. 7 removes many of the details of nut cracking apparatus 10 for ease of discussion. Frame 15 defines hopper 30 and more specifically left side plate 44, rear plate 46, center plate 52, and a hopper floor 56 define hopper 30. Hopper floor 56 has a forward end 58, a rear end 60 and has a downwardly sloping portion 61 that slopes downwardly from rear end 60 in a direction toward forward end 58 until it reaches an upwardly sloping portion 62. Hopper floor 56 is mounted at the rear end 60 thereof to rear plate 46. Hopper floor 56 rests atop and may be mounted to a vibrator 64 which is in turn mounted to a bracket 66 that is attached to center plate 52 and left side plate 44. Vibrator 64 may for example an FMC Syntron Vibrator and may be mounted to bracket 66. Pads 68 may be positioned between bracket 66 and vibrator 64. Center plate 52 has a singulator slot 70 and a vacuum port 72 defined therethrough. An intake chute 74 is used to deliver pecans or other nuts into hopper 30 and onto hopper floor 56. Nuts pass from hopper floor 56 onto endless conveyor 32.

A separator plate 76 is positioned adjacent hopper floor 56, and is positioned between endless conveyor 32 and hopper 30. Endless conveyor 32 delivers nuts from hopper 30 to a pickup point 78 (FIG. 6), at which the nuts are engaged by a cracking unit 25. Vibrator 64 will vibrate hopper floor 56 so that nuts are urged toward and onto endless conveyor 32. Vibrator 64 will urge nuts up the slope of downwardly sloping portion 61 of hopper floor 56, so that nuts at or near upward sloping portion 62 are vibrated toward rear 36 of frame 15 around separator plate 76 and onto endless conveyer 32.

Figure 23:
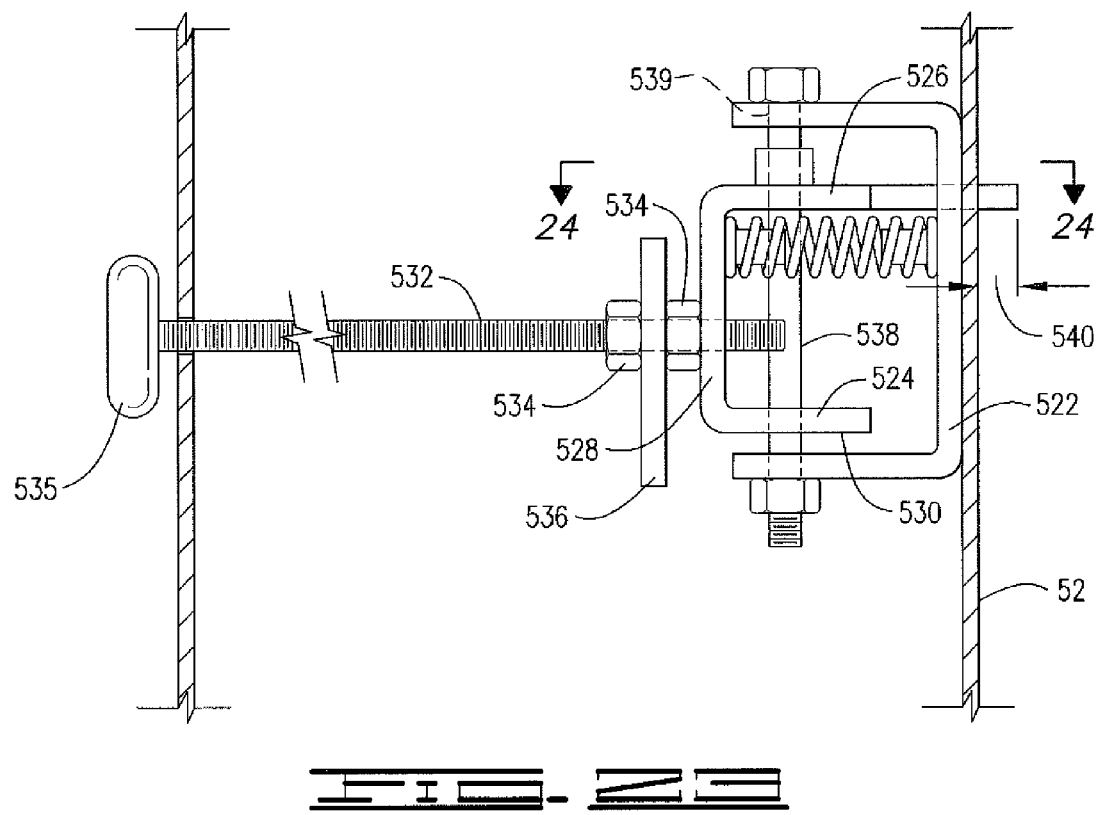
FIG. 23 is a cross section showing a singulator assembly.

Referring now to FIG. 10, details of the rotatable turret 20 may be explained. Rotatable turret 20 comprises a plurality of cylinder assemblies 79. Cylinder assemblies 79 have air cylinders 80 having first or right end 82 and second or left end 84. As shown in FIG. 23 a piston 86 is disposed in air cylinder 80. Cylinder rod 88 is attached to piston 86 and extends from air cylinder 80. Cylinder rod 88 is preferably a two-piece cylinder rod which comprises primary cylinder rod 90 and cylinder rod extension 92 which may be threaded to primary cylinder rod 90. An end 93 of cylinder rod 88 is a generally conically shaped end 93. Air hose fittings 94 and 95 are connected at first and second ends 82 and 84 of air cylinder 80 to provide for the connection of air hoses thereto. Air supplied through fittings 94 and 95 will move piston 86 in air cylinder 80, thereby moving cylinder rod 88. A threaded fitting 96 extends from a forward face 98 of air cylinder 80. FIG. 23 shows cylinder rod 88 extended to hold a nut for cracking Rotatable turret 20 includes a turret sprocket 100, which has a plurality of cylinder openings 102. A threaded fitting 96 will extend through each of cylinder openings 102. Turret sprocket 100 has a plurality of air hose openings 103 which will receive air hoses therethrough which will be attached to fittings 94 and 95. A threaded nut 104 is threaded to each of forward fittings 96 to attach air cylinders 80 to turret sprocket 100. An internal threaded opening 106 of threaded nut 104 has a diameter 108 sufficient to allow cylinder rod 88, including cylinder rod extension 92 to pass therethrough so that removal of an air cylinder 80 may be easily accomplished simply by unthreading nut 104 and pulling cylinder rod extension 92 through nut 104 and cylinder opening 102 in turret sprocket 100.

A turret shaft assembly 110 comprising a turret shaft plate 112 and a turret shaft 114 connected thereto is attached to turret sprocket 100. Turret shaft 114 may be connected to turret shaft plate 112 by any means known in the art such as for example bolting or welding. Turret shaft 114 extends into and is received in a bearing, such as for example a flanged bearing 116 which is attached to right side plate 50. Flanged bearing 116 allows for the free rotation of turret shaft assembly 110 and likewise the free rotation of rotatable turret 20.

A spacer pipe 120 which may be referred to as long or first spacer pipe 120 is attached to turret sprocket 100 with fasteners 122 at a first or right end 124 thereof. Second end 126 of long spacer pipe 120 engages and, as will be explained in more detail hereinbelow, is attached to a feed bushing plate 128. Feed bushing plate 128 may be comprised of a plastic material, for example a plastic sold under the trademark Delrin®. Feed bushing plate 128 has a plurality of openings 130 through which cylinder rod extensions 92 extend. Feed bushing plate 128 has a plurality of hose openings 132 therein and more specifically forty-eight hose openings 132, which will receive air hoses for delivering air to air cylinders 80 though fittings 94 and 95. A plurality of openings 134 will receive fasteners which will extend therethrough into long spacer pipe 120. Feed bushing plate 128 has first or right side 136 and second, or left side 138. Details of the assembly have been omitted in FIG. 6 so that the left side 138 of feed bushing plate 128 is visible.

A second or short spacer pipe 140 engages left side 138 of feed bushing plate 128 at its first end 142 thereof. Second end 144 of short spacer pipe 140 engages a gasket which is preferably a metal gasket 146 which partially covers the first or right face 148 of a shuttle drum 150.

Figure 22:
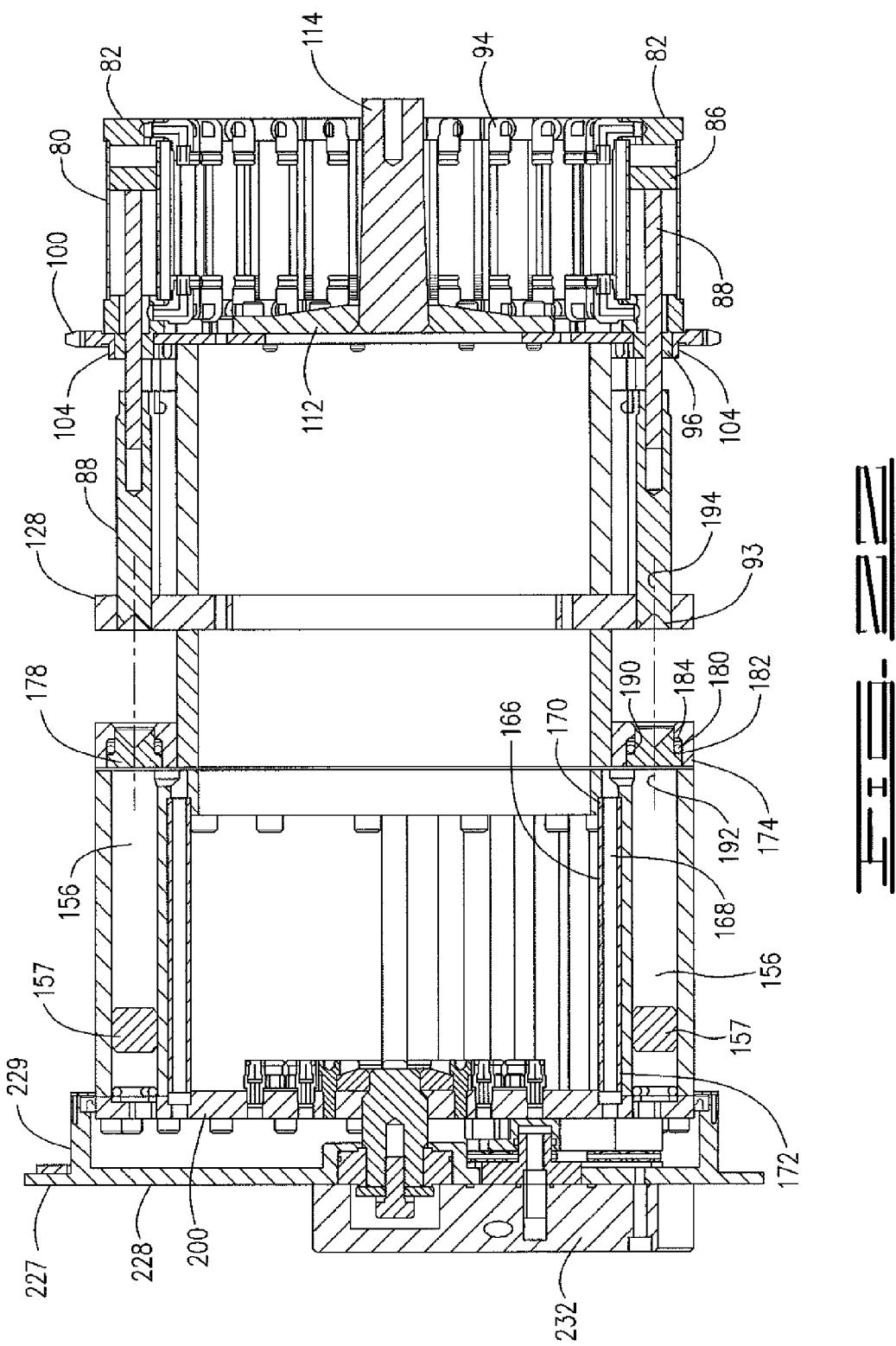
FIG. 22 is a cross section of the turret assembly.

Right face 148 of shuttle drum 150 is shown in FIG. 22. As better seen therein shuttle drum 150 comprises a generally cylindrical portion 152 and a radially inwardly extending shoulder 154. A plurality of shuttle passages 156 with shuttles 157 disposed therein extend from the second, or left face 158 to the right or first face 148 of shuttle drum 150. A plurality of fasteners 160 extend through radially inwardly extending shoulder 154, gasket 146, short spacer pipe 140, feed bushing plate 128, and are threaded into openings in second end 126 of long spacer pipe 120 to connect the components together. Shuttle drum 150 has a connecting passage 162 in the first face 148 thereof to communicate shuttle passage 156 with a return air port 164 in shoulder 154. A return air pipe 166 defining a return air passageway 168 is inserted, into and is closely received in return air port 164. Return air pipe 166 has a first or right end 170 and a second or left end 172.

A crack die plate 174 is mounted to shuttle drum 150, with gasket 146 therebetween. Crack die plate 174 has a plurality of crack die openings 176 for receiving a plurality of crack dies 178. An O-ring 180 is positioned between a shoulder 182 on crack die 178 and a shoulder 184 on crack die plate 174. Crack die plate 174 is mounted to shuttle drum 150 with a plurality of fasteners 186 which extend through crack die plate 174 and gasket 146 into threaded openings 188 on shuttle drum 150. Gasket 146 is positioned between crack die plate 174 and right face 148 of shuttle drum 150. Crack dies 178 have an axis 190 and a generally conically inner surface 192. Axis 190 will be aligned with an axis 194 of a corresponding piston rod 88. A shuttle 157, crack die 178 and corresponding air cylinder 80 and cylinder rod 88 comprise a cracking unit 25.

A valve plate 200 is attached with fasteners 202 to the left side 158 of shuttle drum 150. Valve plate 200 has a plurality of slots 204 extending therethrough. A second slot 206, which may be referred to as a counterslot 206 extends partially through valve plate 200. Valve plate 200 has first or right side 208 and a second or left side 210. Counterslot 206 is defined in right side 208. Counterslot 206 has a length greater than that of slot 204. Slots 204 may be referred to as crack air slots 204 since as will be explained in more detail, air to crack nuts will be provided therethrough.

Valve plate 200 has a plurality of bores 212 therethrough with counterbores 214 on the right side thereof for receiving the second end 172 of return air pipes 166. Valve plate 200 has a plurality of release openings 216 and a plurality of feed/stress openings 217 defined therethrough. Fittings 218 and 219 are connected to openings 216 and 217 respectively. Air hoses will be connected to each of fittings 218 and 219 and will pass through the center of shuttle drum 150, short spacer pipe 140, hose openings 132 in feed bushing plate 128, long spacer pipe 120 and openings 103 in turret sprocket 100. Hoses from fitting 218 will be connected to fittings 95 at second end 84 of air cylinder 80 and hoses from fitting 219 will be connected to fitting 94 at first end 82 of air cylinder 80 to provide air thereto.

Figure 17:
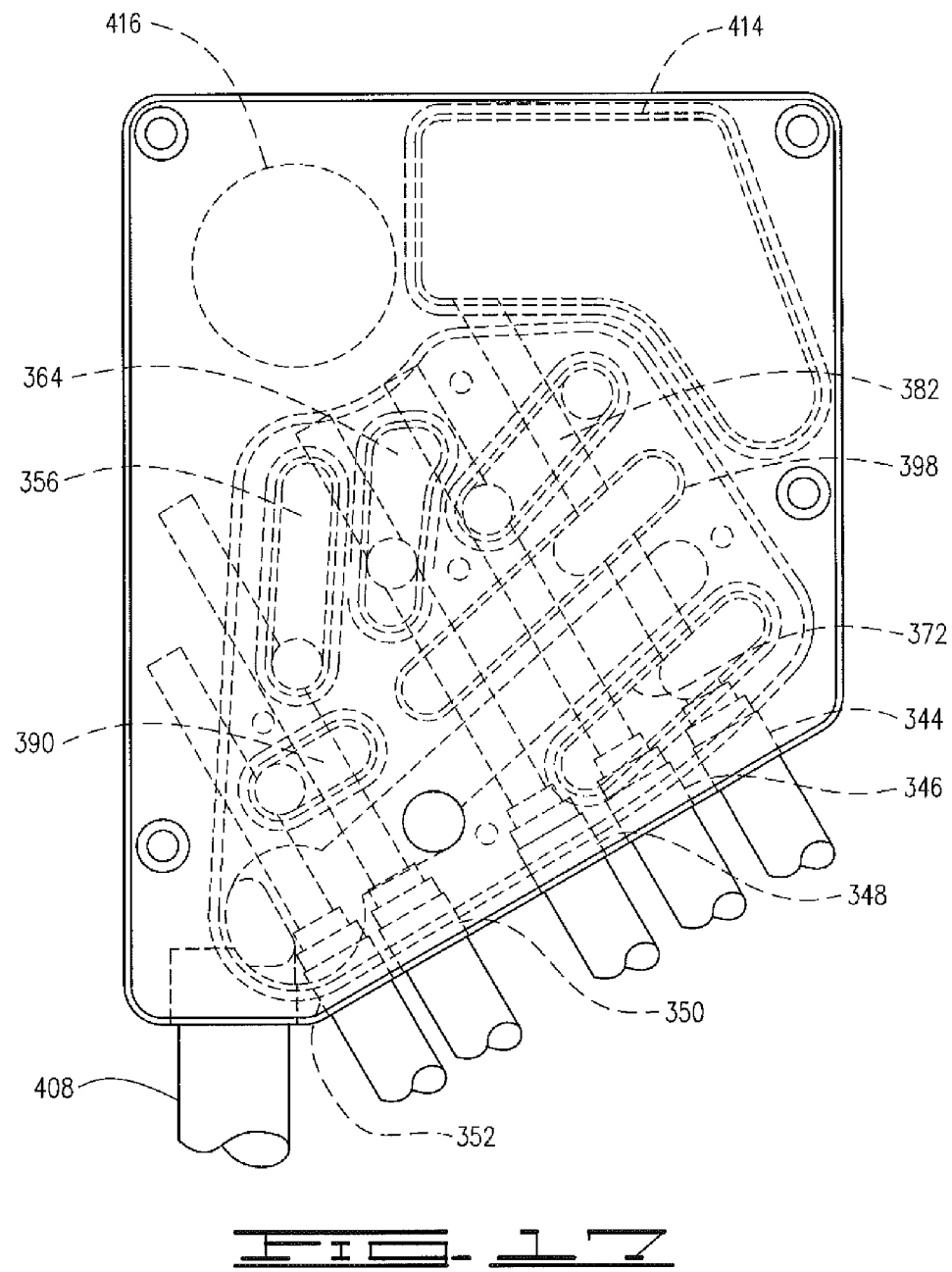
FIG. 17 is a left side view of a valve cover.

A valve shaft assembly 220 comprising a valve shaft plate 222 and a valve shaft 224 are attached to valve plate 200 with fasteners 226. Valve shaft 222 extends through a valve base plate 228 which is mounted at left side 40 of nut cracking apparatus 10. Valve shaft 226 extends through a bearing assembly 230 that is mounted in valve base plate 228 and allows free rotation thereof. Valve base plate 228 has a plate portion 227 and a shoulder portion 229. A seal 231 and seal retainer 231a may be disposed on shoulder portion 229. Valve base plate 228 will be attached to left side plate 44, so that shoulder portion 229 extends therethrough. A valve cover 232, valve attachment plate 234 and valve assembly 235, which comprises valves 236 and 238, are mounted to valve base plate 228, and will extend through cutout 233 in valve base plate 228. First and second valves 236 and 238 are preferably made from a non-metallic material such as for example Delrin®. As shown in FIGS. 1 and 17, valve cover 232 provides for the inlet of crack air, release air, stress air, release air and reset air, all of which are directed through the valves 236 and 238 to provide the designated functions. Details of the valve cover 232, valve attachment plate 234, and valve 236 and 238 will be described in more detail with the operation of nut cracking apparatus 10.

Figure 2:
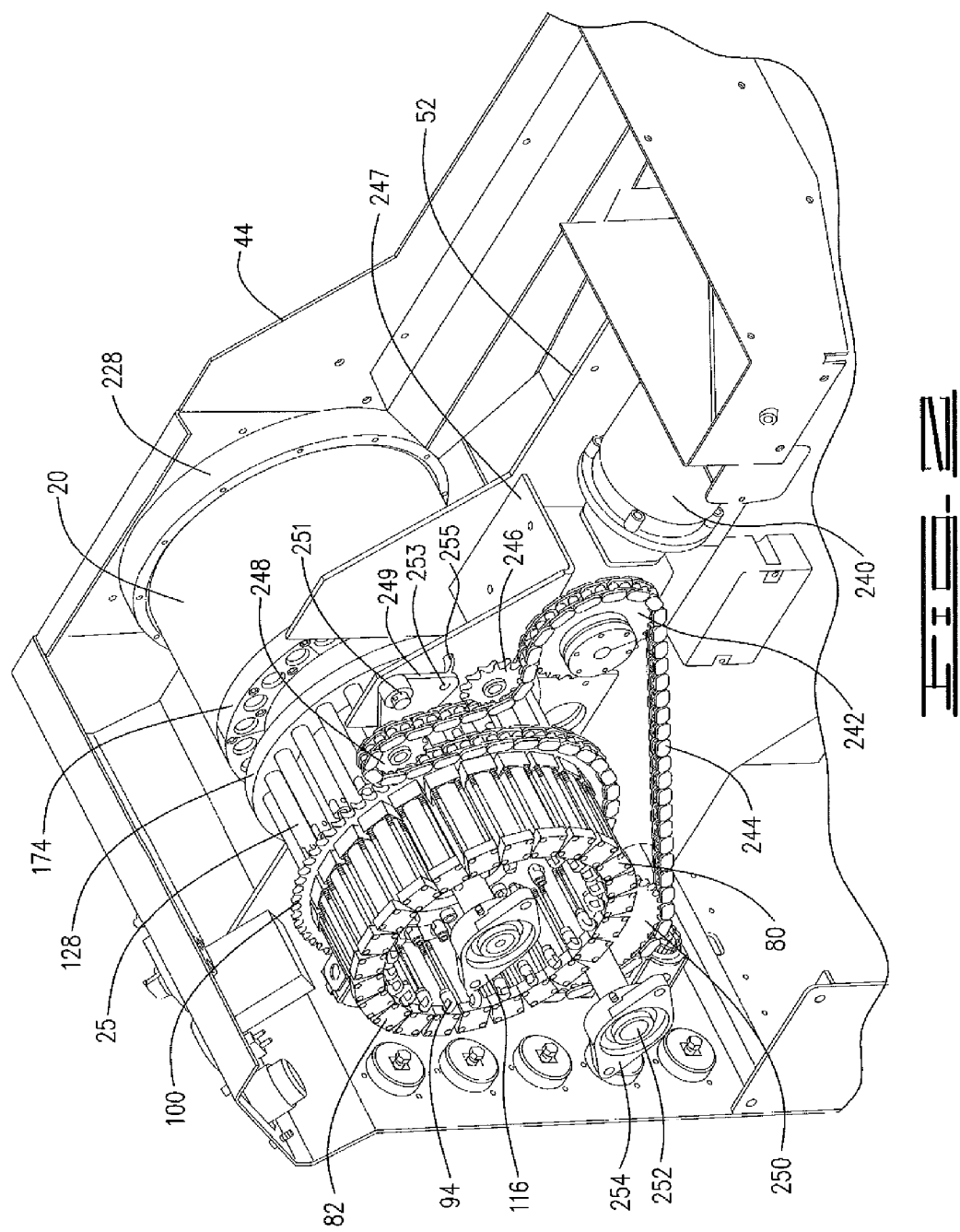
FIG. 2 is a perspective view of the top nut cracking apparatus with the top and other details removed to show the turret and sprocket installation.
Figure 3:
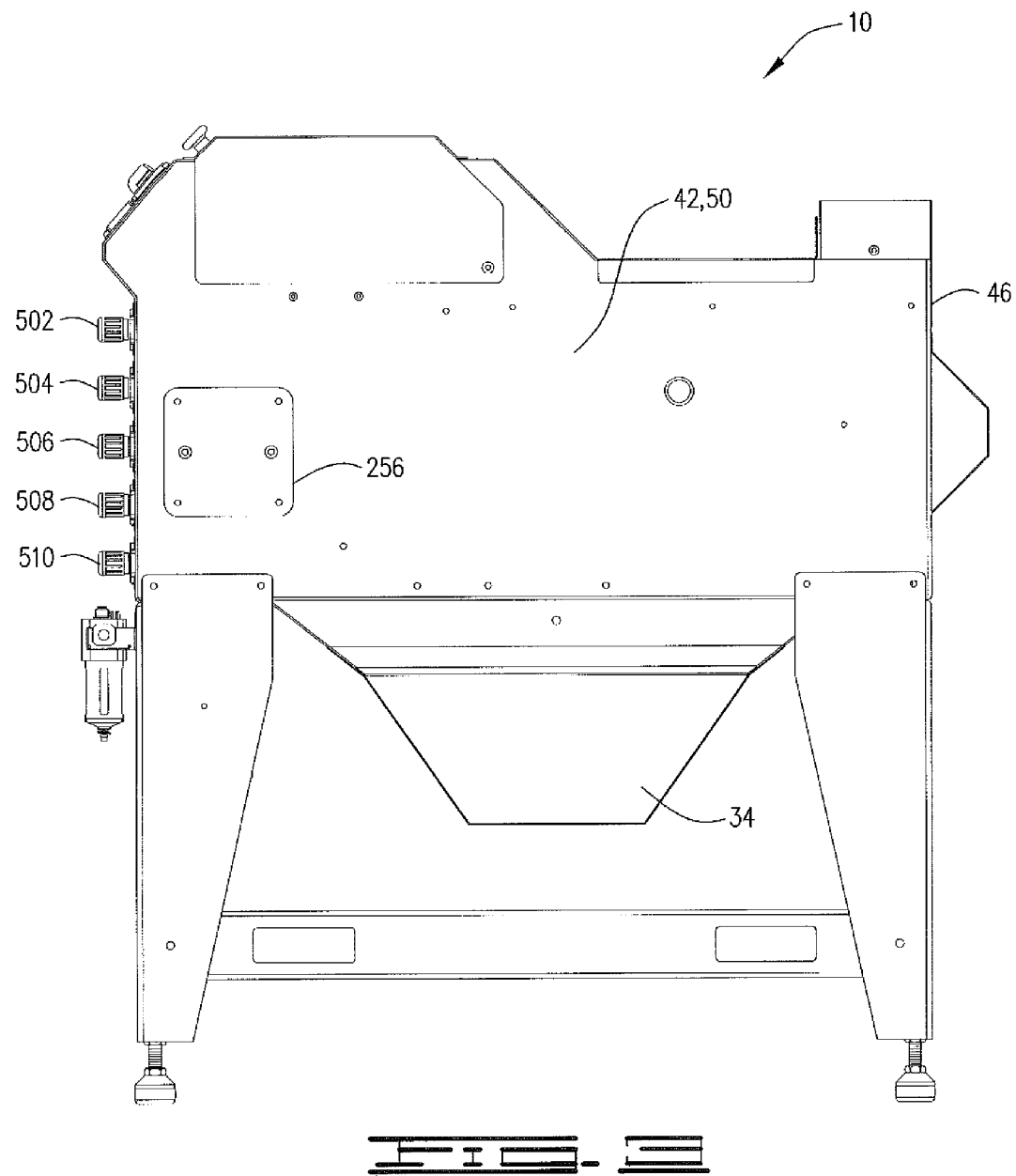
FIG. 3 is a right side view of the nut cracking apparatus.
Figure 4:
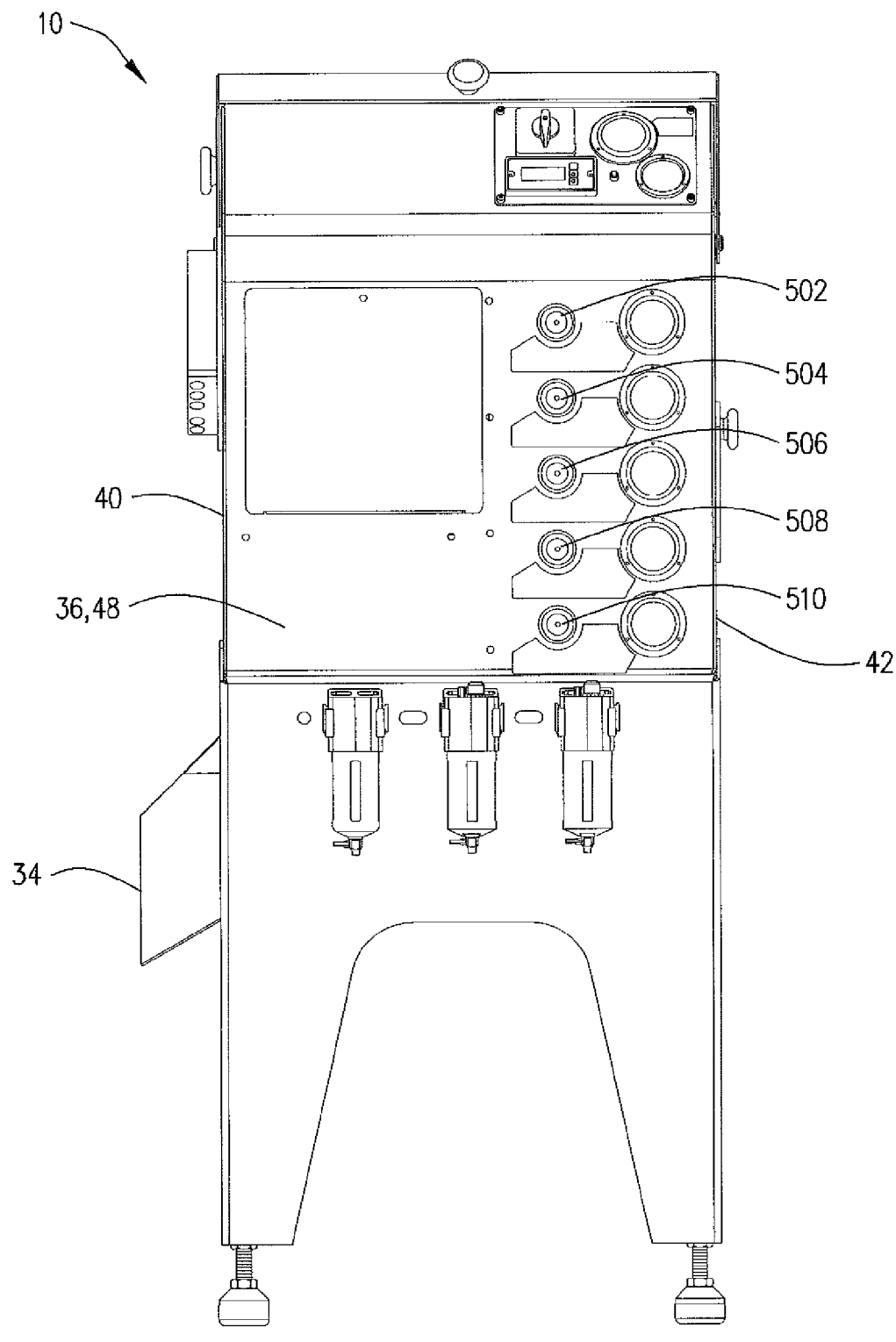
FIG. 4 is a front view of the apparatus.
Figure 5:
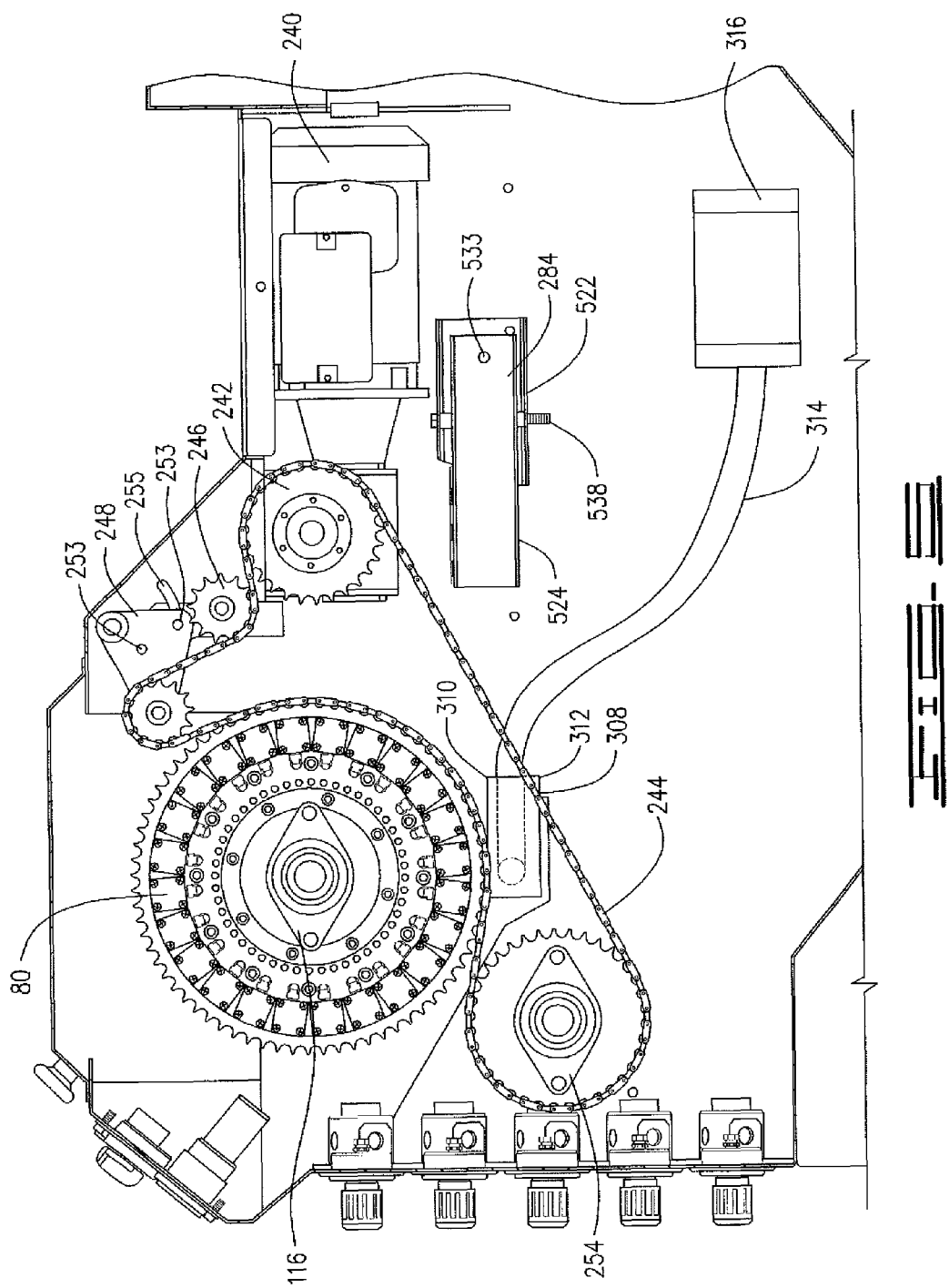
FIG. 5 is a view looking from the right with certain details removed to show the drive chain and sprocket configuration.
Figure 5:
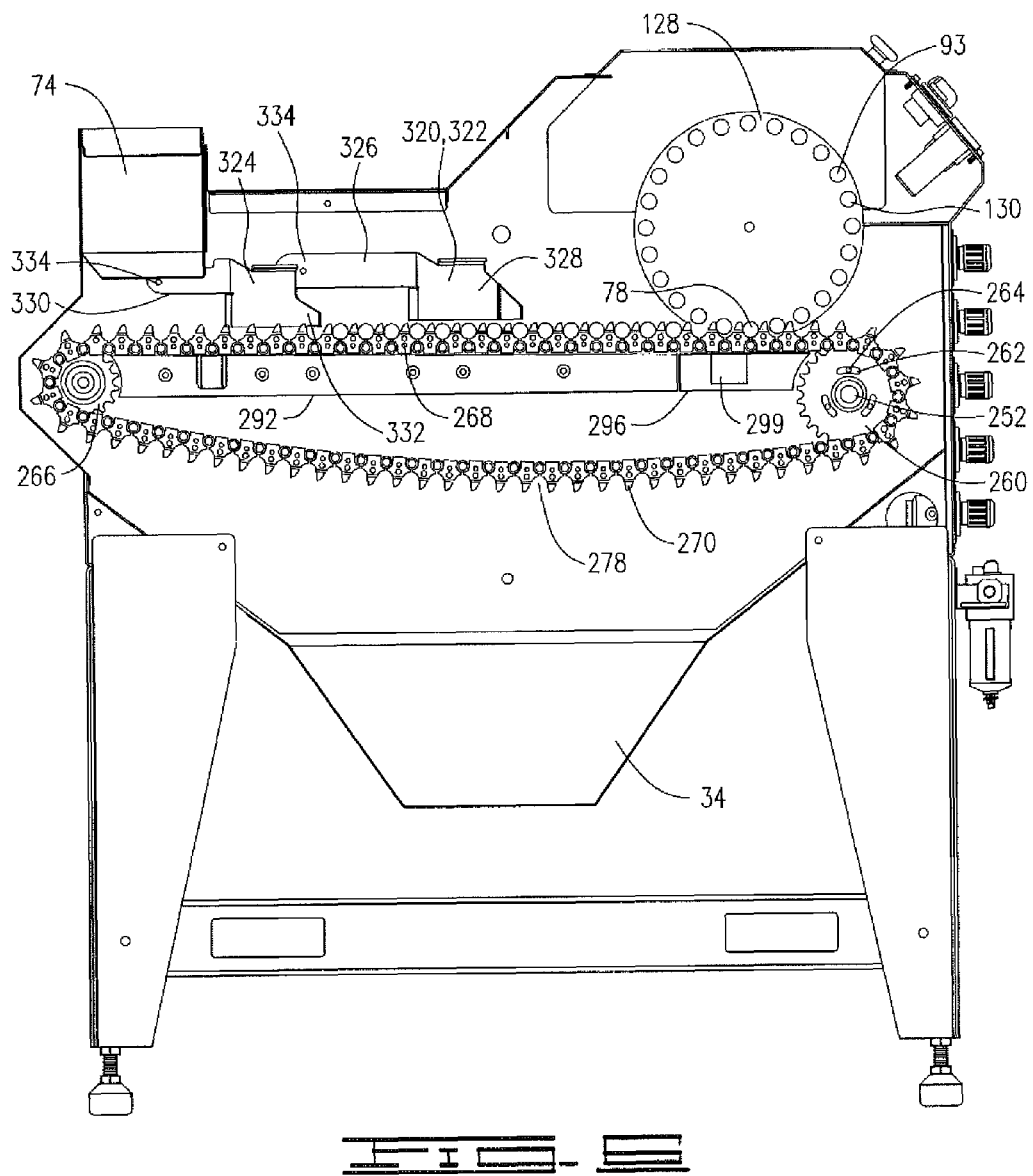

Referring now to FIGS. 2 and 5, a motor 240 may be mounted to frame 15 with brackets and fasteners or other means known in the art. The motor may be mounted to center plate 52 or to right side plate 50 or both. Motor 240 rotates a drive sprocket 242 which is engaged by a chain 244. Chain 244 engages a first idler sprocket 246 mounted to a bracket 247, a second idler sprocket 248 rotatably mounted to a mounting plate 249, turret sprocket 100 and a chain drive sprocket 250. Bracket 247 is mounted to center plate 52. Motor 240 may be attached to bracket 247 as well as to center plate 52. Mounting plate 249 is rotatable about a pin 251. Fasteners 253 extend through slots 255 in bracket 247. Only one fastener 253 and slot 255 is shown, but the assembly preferably included at least two, one of which in FIG. 2 is hidden by idler sprocket 248. Chain 244 may be tightened by loosening fasteners 253, rotating mounting plate 249, and tightening the fasteners 253. Chain drive sprocket 250 rotates about a shaft 252 which is received in a flanged bearing 254 that is mounted to plate 256 which is in turn mounted to right side plate 50. In operation, motor 240 will cause rotation of rotatable turret assembly 20 in a clockwise direction as viewed in FIG. 5. Turret assembly 20 will rotate at a speed sufficient to provide for cracking in excess of 1400 nuts per minute, which is about 58 rpm.

Referring now to FIG. 6 shaft 252 will extend through center plate 52 and specifically through a bearing of a type known in the art such as for example a flanged bearing, mounted in center plate 52, which will support and allow the rotation of shaft 252. Shaft 252 is mounted to a sprocket plate, or sprocket fitting 258 (FIG. 29). Shaft 252 is fixed to sprocket fitting 258, by welding or other means known in the art, so that fitting 258 will rotate therewith. Shaft 252 extends through sprocket fitting 258, and through a forward chain sprocket 260. Forward chain sprocket 260 has three slots 262 with fasteners 264 extending therethrough connecting forward chain sprocket 260 to forward chain sprocket fitting 258, which will have threaded openings for receiving fasteners 264. Slots 262 and fasteners 264 provide for the quick and efficient timing of nut cracking apparatus 10. Endless conveyor 32 is disposed about forward chain sprocket 260 and a rear chain sprocket 266. When motor 240 rotates drive sprocket 242, drive sprocket 242 in turn rotates chain drive sprocket 250 which causes the rotation of forward chain sprocket 260 and movement of endless conveyor 32.

Figure 8:
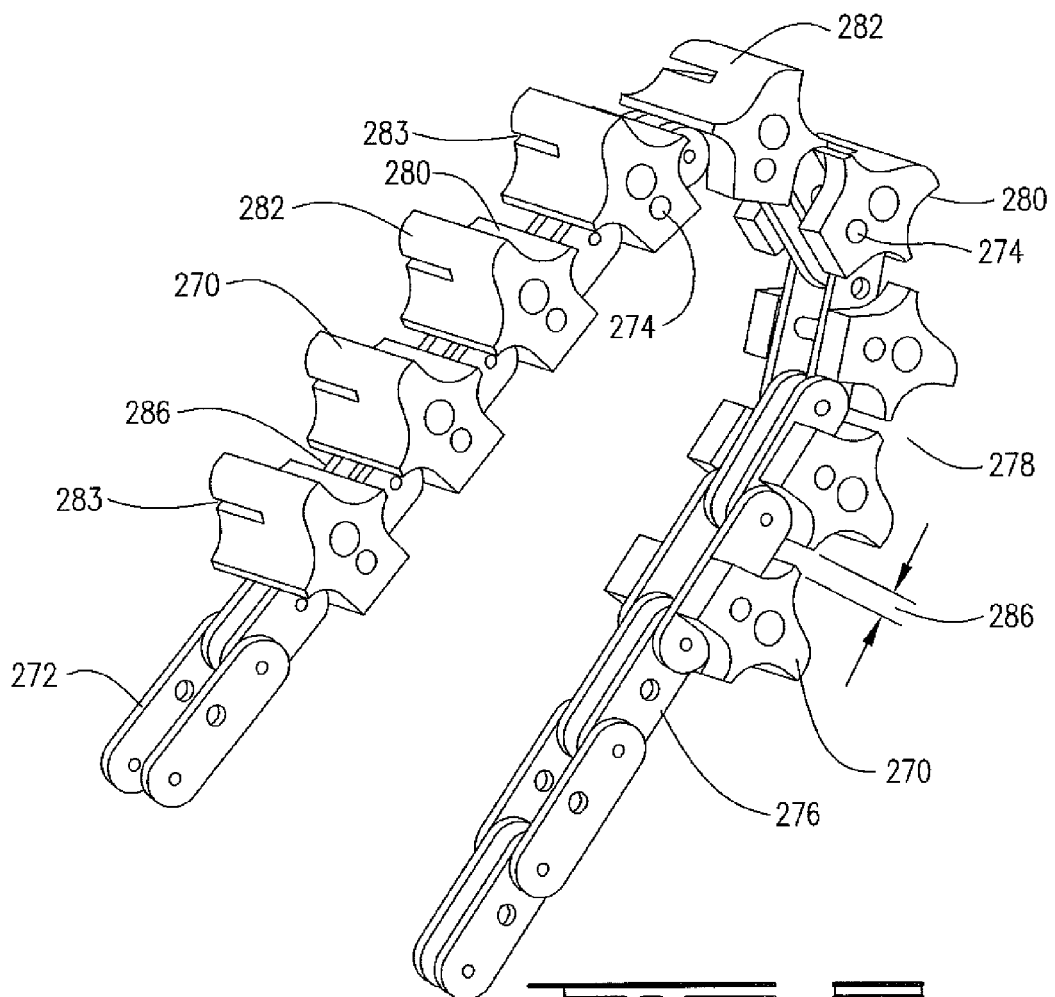
FIG. 8 is a view of the components of the endless conveyor.
Figure 24:
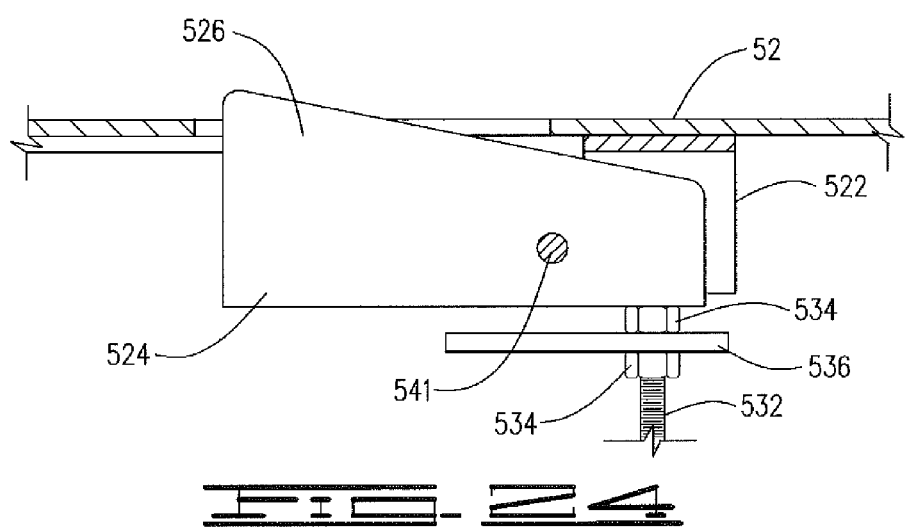
FIG. 24 is a view looking down at a singulator.

Endless conveyor 32 has a carrying portion 268 which is a horizontal carrying portion. Carrying portion 268 extends from the delivery point, which is the point at which endless conveyor 32 picks up a nut in hopper 30, to pickup point 78. Endless conveyor 32 comprises a plurality of nut pocket segments 270, each of which is connected to a nut pocket chain, or conveyor chain 272. Each nut pocket segment 270 is attached with a pin 274 extending through a link 276 in nut pocket chain 272. Endless conveyor 32 thus comprises a plurality of nut pockets 278 defined by nut pocket segments 270. Each nut pocket segment 270 has a forward portion 280 and a rear portion 282, so that each nut pocket 278 is formed by the rear portion 282 of one nut pocket segment 270 and the forward portion 280 of an adjacent nut pocket segment 270. Each nut pocket segment has a nut pocket singulator slot 283. Nut pocket singulator slot 283 will allow for the extension into each nut pocket segment 270 of a singulator 284, which is better seen in FIGS. 5, 23 and 24. The effective width of each pocket 278 may be adjusted by extending the singulator 284 into the nut pocket singulator slot 283 through center plate singulator slot 70. Adjustments may be made while nut cracker apparatus 10 is operating, to ensure that only one nut is positioned lengthwise in each nut pocket 278. Each nut pocket segment 270 is spaced from the adjacent nut pocket segment 270 and does not come into contact with the adjacent nut pocket segment 270 at any time during the movement of endless conveyor 32. The space between nut pocket segments 270 is readily seen in FIG. 8 and is identified as space 286.

Referring again to FIG. 6, the face of feed bushing plate 128 is seen along with the ends of cylinder rod extensions 92. Other openings in feed bushing plate 128 are not shown in FIG. 6. As shown therein cylinder rod end 93 will align with a nut pocket 278 at bottom dead center such that axes 190 and 194 are aligned. To time apparatus 10, one of cylinder rods 88 that is positioned prior to reaching bottom dead center is extended and a timing bushing is placed over the cylinder rod end 93. Fasteners 264 are loosened and turret 20 is rotated. Rotation of turret 20 clockwise as viewed in FIG. 5 will cause rotation of forward chain sprocket 260, so that endless conveyer 32 and turret 20 move simultaneously. As turret 20 rotates, the timing bushing on cylinder rod 88 will engage endless conveyor 32, and will move into a nut pocket 278. Because forward chain sprocket 260 can move relative to chain sprocket fitting 258, the position of the nut pocket 278 will adjust as sprocket 260 moves to allow the timing bushing to rest in a nut pocket 278 at bottom dead center, so that axes 190 and 194 are aligned. Fasteners 264 are tightened, and turret 20 and endless conveyor 32 are timed for operation.

A chain slide 292, which may be comprised of a UHMW plastic, is mounted to center plate 52 and positioned beneath endless conveyor 32. Chain slide 292 provides support for endless conveyor chain 32 as it passes through hopper 30. Side plate 76 which is better seen in FIG. 7 is positioned between hopper floor 56 and chain slide 292 and is attached by welding or other means to hopper floor 56. Chain slide 292 has a forward portion 296 so that chain slide 292 may comprise one or more pieces attached to center divider plate 52. Forward portion 296 is shown in FIGS. 25-27, and may be referred to as a fragment collector 296. Fragment collector 296 has an upper surface 298 above which endless conveyor 32 moves. Fragment collector 296 has a downwardly sloped surface 299 which will be located at or prior to the point at which nuts are cracked by cracking units 25 so that shell fragments and sediment will pass through the space 286 between nut pocket segments 270. Endless conveyor 32 thus provides for a cleaner, more stable surface on which a nut will rest.

Figure 9:
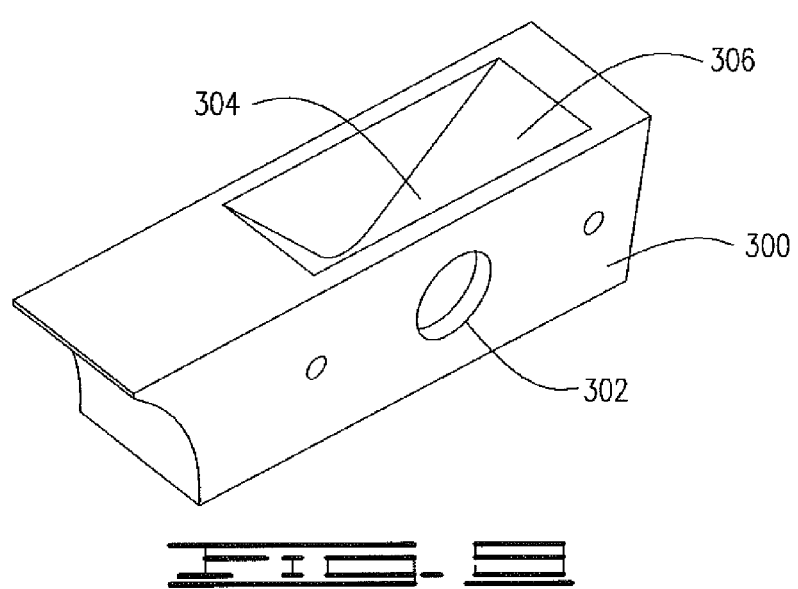
FIG. 9 shows an embodiment of a vacuum block.
Figure 15:
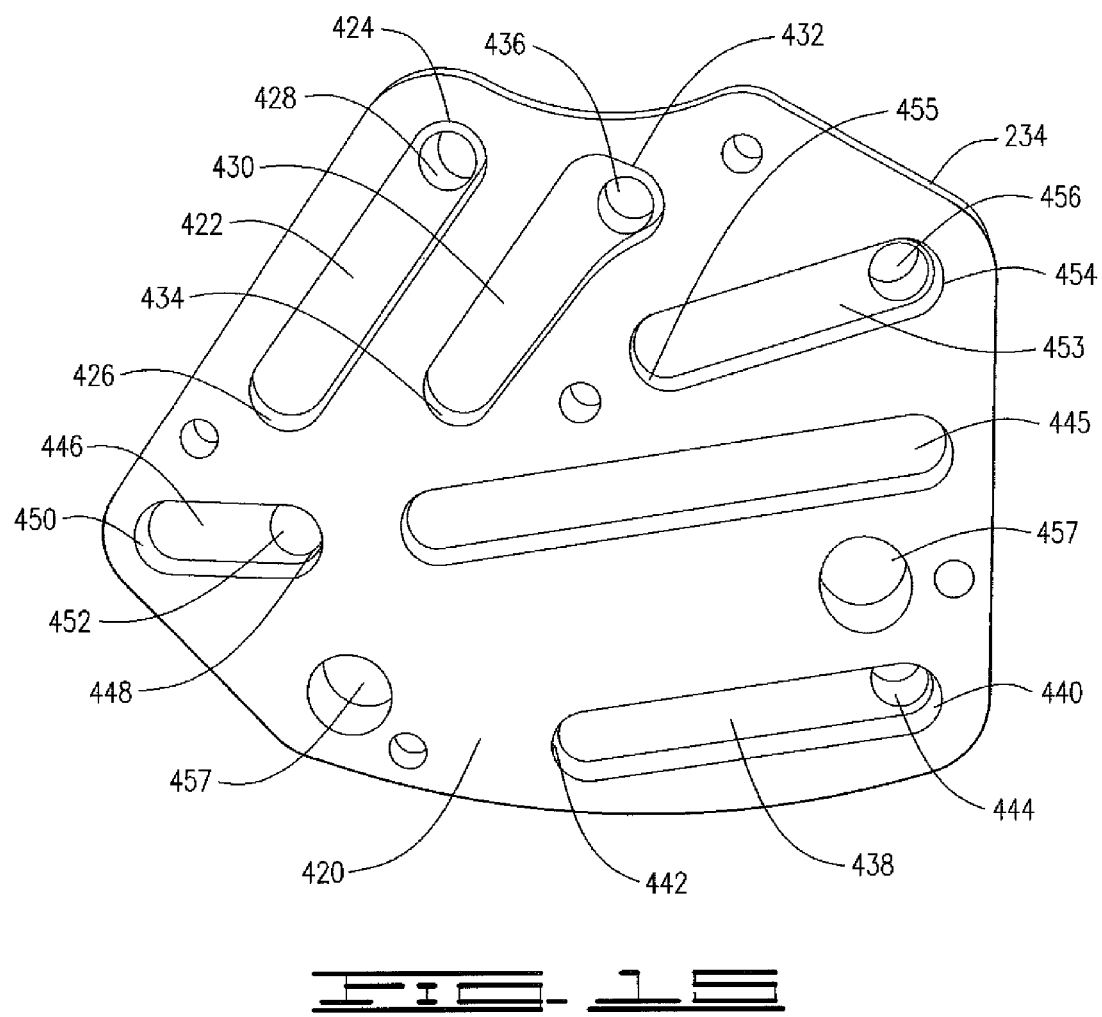
FIG. 15 is a left side view of a valve attachment plate.

In a separate embodiment, a forward portion 300 of chain slide 292 may be utilized in place of forward portion 296. Forward portion 300 which is shown in FIG. 9 may be referred to as a vacuum block 300, and is utilized when a vacuum system is employed with nut cracking apparatus 10. Vacuum block 300 has vacuum block opening 302 therethrough, and is mounted to center plate 52 such that vacuum block opening 302 is aligned with vacuum opening 72 in center plate 52. A sloped cavity 304 is defined in the upper surface 306 of vacuum block 300. Referring now to FIG. 5 a vacuum manifold 308 is mounted to center plate 52 and has a manifold opening 310 in a first end 312 thereof to allow a vacuum hose 314 to be inserted therein. Manifold opening 310 communicates with vacuum opening 72 in center plate 52 so that a vacuum pulled through hose 314 will draw air through vacuum block opening 302 and spaces 286 between nut pocket segments 270 as the nut pocket segments 270 pass thereover. The vacuum will serve two functions, namely, to help to pull any sediment and/or nut fragments through the spaces and also to center and align and hold nuts in nut pocket 270 to prepare the nuts for engagement and cracking by cracking units 25. Vacuum hose 314 may be connected to a vacuum source 316 of any type known in the art which may be mounted to frame 15 or which may be positioned on a surface near frame 15.

A pair of deflector plates 320 which may be referred to as deflector plates 322 and 324 may likewise be mounted to center plate 52. Deflector plate 322 has a strap or attachment portion 326 and a deflector portion 328. Likewise, deflector plate 324 has a strap or attachment portion 330 and a deflector portion 332. Both of deflectors 322 and 324 may be connected to center plate 52 with pins or other connectors 334 in strap portions 326 and 330, respectively, thereof. An attachment configuration which may be used for deflector plates 320 is shown in FIG. 28. A bracket, such as for example right angle bracket 336 can be attached to center plate 52 to engage an adjustment nut 338. The deflector portion of each of first and second deflectors 322 and 324 may be a right angle shape such that rotation of adjustment nut 338 will cause the deflector portion of each to pivot about the attachment pins 334 for each deflector thus raising or lowering the deflector to aid in scraping nuts off of the endless conveyor 32 such that only one nut will be carried by each nut pocket 278.

Referring now back to FIGS. 13-19 the components for directing air may be described. Valve cover 232 has first or right side 340 and second or left side 342. A plurality of openings for receiving air are defined in valve cover 232 and include a crack air opening 344, release air opening 346, stress air opening 348, feed air opening 350 and reset air opening 352. As shown in FIG. 1 air hoses and fittings of a type known in the art may be connected to each of openings 344, 346, 348, 350 and 352 to provide air thereto, which will be supplied by an air compressor.

Figure 18:
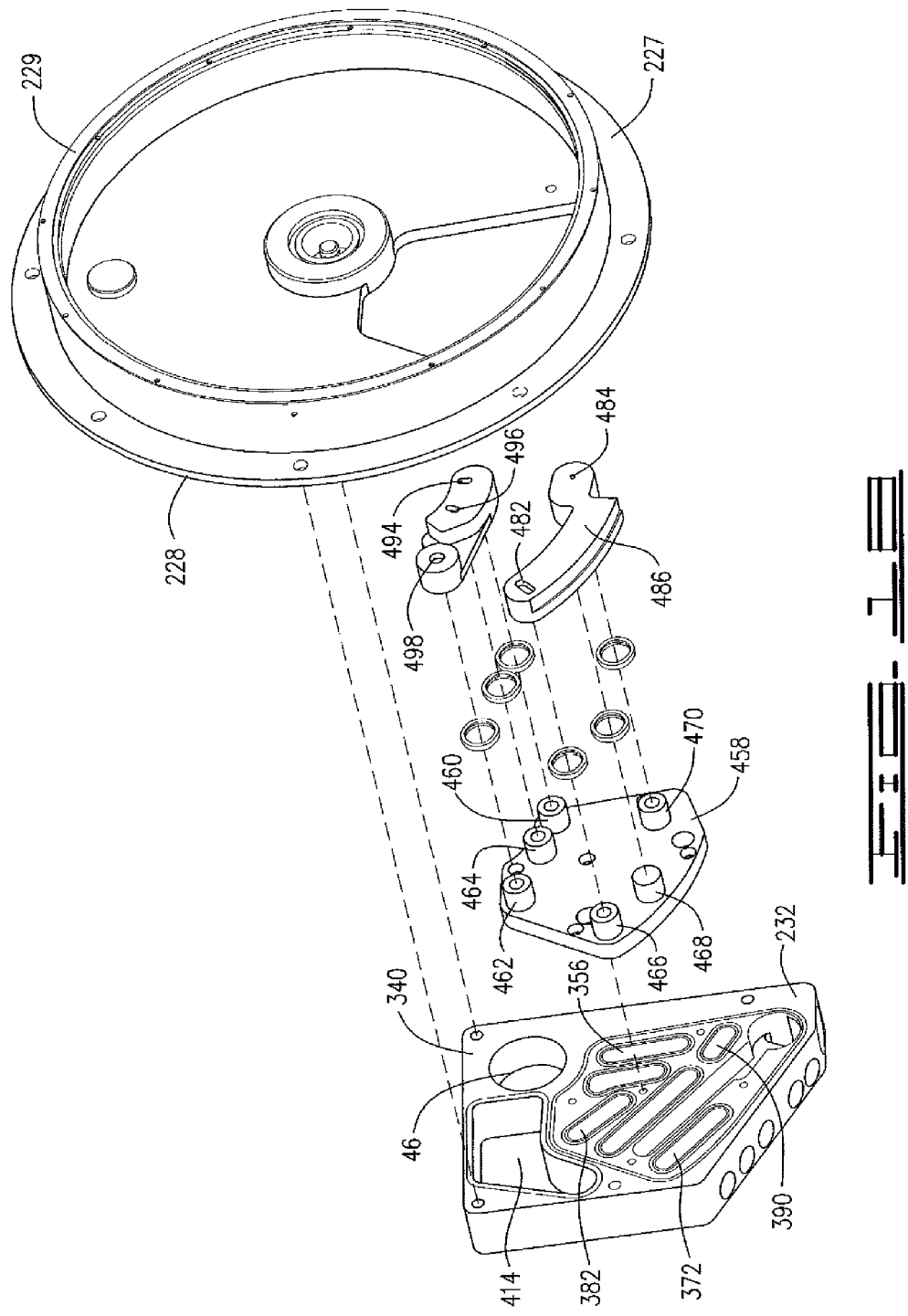
FIG. 18 is an exploded view of a valve base plate and attachments.

FIG. 18 shows right side 340 of valve cover 232. A feed slot 356 is defined on right side 340 and extends partially therethrough. Feed slot 356 has first end 358 and second end 360. An opening 362 at the first end 358 of feed slot 356 extends from right side 340 to a depth greater than the depth of slot 356 and will communicate with feed air opening 350 so that air may be provided to feed slot 356 therethrough.

A stress slot 364 is defined on right side 340 of valve cover 232 and extends partway therethrough. Stress slot 364 has first end 366 and second end 368 and has an opening 370 defined therein between first and second ends 368 and 370 which will communicate with stress air opening 348.

A crack slot 372 is defined in right side 340 of valve cover 232 and has first and second ends 374 and 376, respectively. Crack slot 372 defines a deep slot portion 378 and a shallow slot portion 380. Crack air opening 344 intersects deep slot portion 378 to provide crack air to crack slot 372.

A release slot 382 defined in right side 340 of valve cover 232 has first end 384, second end 386 and has an opening 388 which extends beyond the depth of release slot 382 and intersects with the release air opening 346 to provide air to release slot 382.

A reset slot 390 has first end 392, second end 394 and an opening 396 extending further than the depth of reset slot 390 to intersect with reset air opening 352. A dump air slot 398 has first end 400 and second ends 402. A generally circular opening 404 is positioned at second end 402, and will communicate with a dump air opening 406 which may have, as shown in FIG. 1, a hose 408 connected thereto which will allow for air and residual oil to pass therethrough.

An auxiliary slot 410 has a shallow auxiliary slot portion 411 and a deep auxiliary slot portion 412 and is generally used as an accumulator to accumulate any air between valve cover 232 and valve attachment plate 234. Valve cover 232 has accumulator cavities 414 and 416 defined therein as well. O-rings 418 configured to match the size and shapes of the slots may be utilized to provide a seal between component parts.

Figure 16:
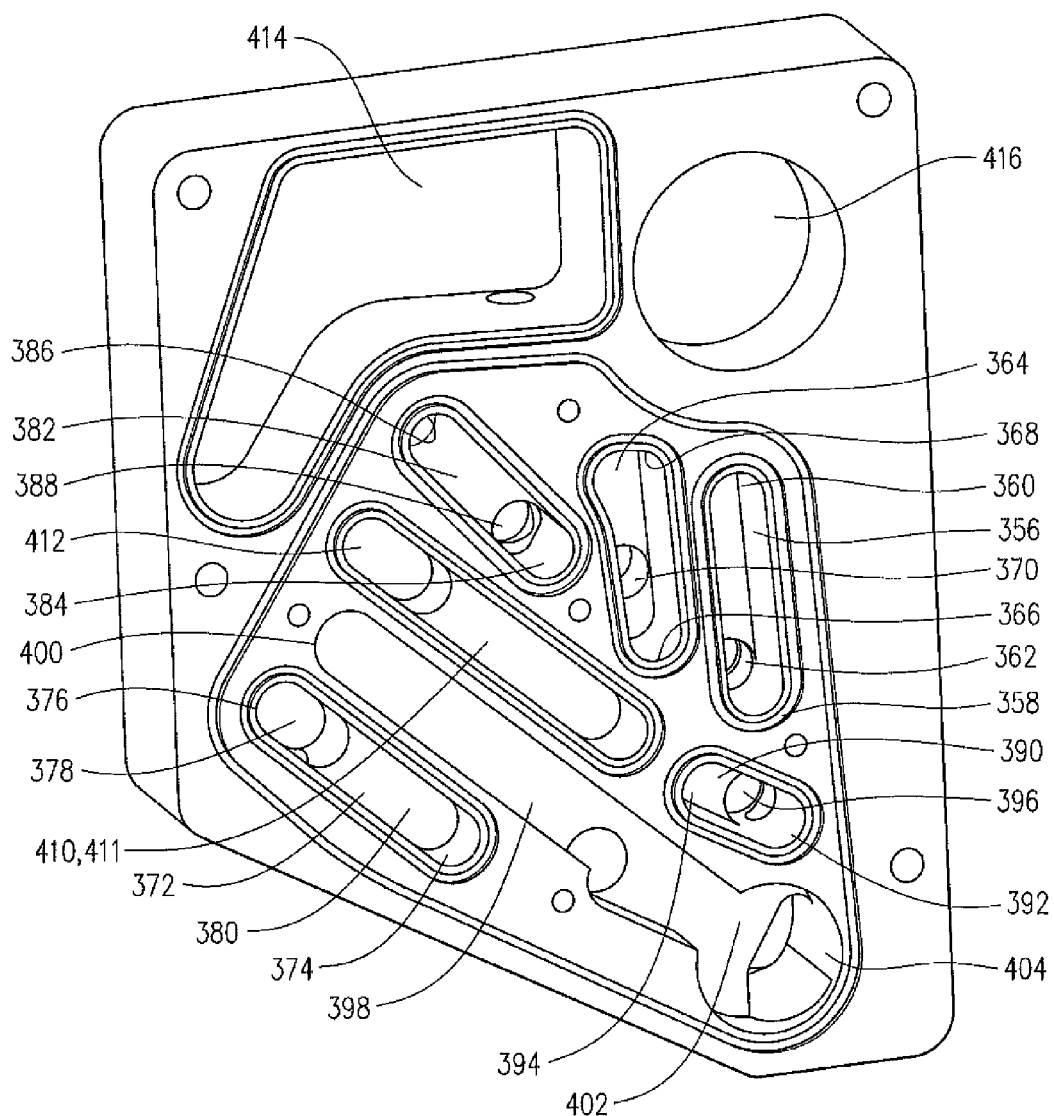
FIG. 16 is a right side perspective view of a valve cover.

A left side 420 of valve attachment plate 234 may be described with reference to FIG. 16. Valve attachment plate 234 has a plurality of mating slots defined therein to mate with the slots of the valve cover 232. A feed air mating slot 422 has first and second ends 424 and 426 and has a feed air delivery opening 428 at the first end 424 thereof for delivering feed air received from the feed slot 356 in valve plate 232.

A stress air mating slot 430 has first and second ends 432 and 434 and has a stress air delivery opening 436 at the first end 432 thereof for delivering stress air received from the stress slot 364 in valve plate 232.

A crack air mating slot 438 has first and second ends 440 and 442 and has a crack air delivery opening 444 at the first end 440 thereof for delivering crack air received from the crack slot 372 in valve cover plate 232. Valve attachment plate 234 has auxiliary mating slot 445 to mate with auxiliary slot 410 in valve cover 410. A reset air mating slot 446 has first and second ends 448 and 450 and has reset air delivery opening 452 defined at the first end 448 thereof for delivering air received from the reset slot 390 in valve cover plate 432. A release air mating slot 453 has first and second ends 454 and 455 and has a release air delivery opening 456 for delivering release air received from the release slot 382 in valve cover 232. A pair of dump holes 457 are defined through valve attachment plate 234.

Figure 19:
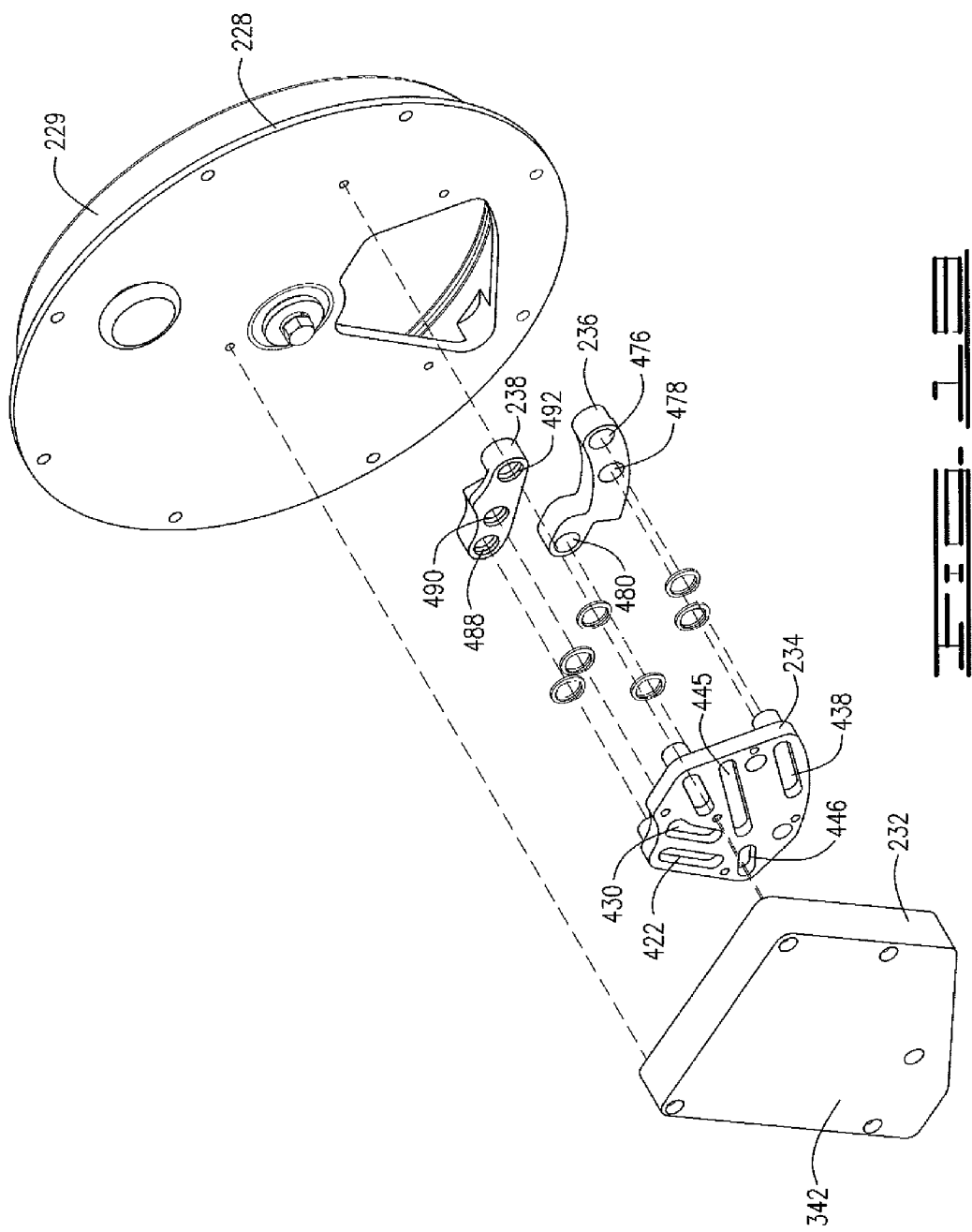
FIG. 19 is an exploded view from the opposite direction of FIG. 20.
Figure 20:
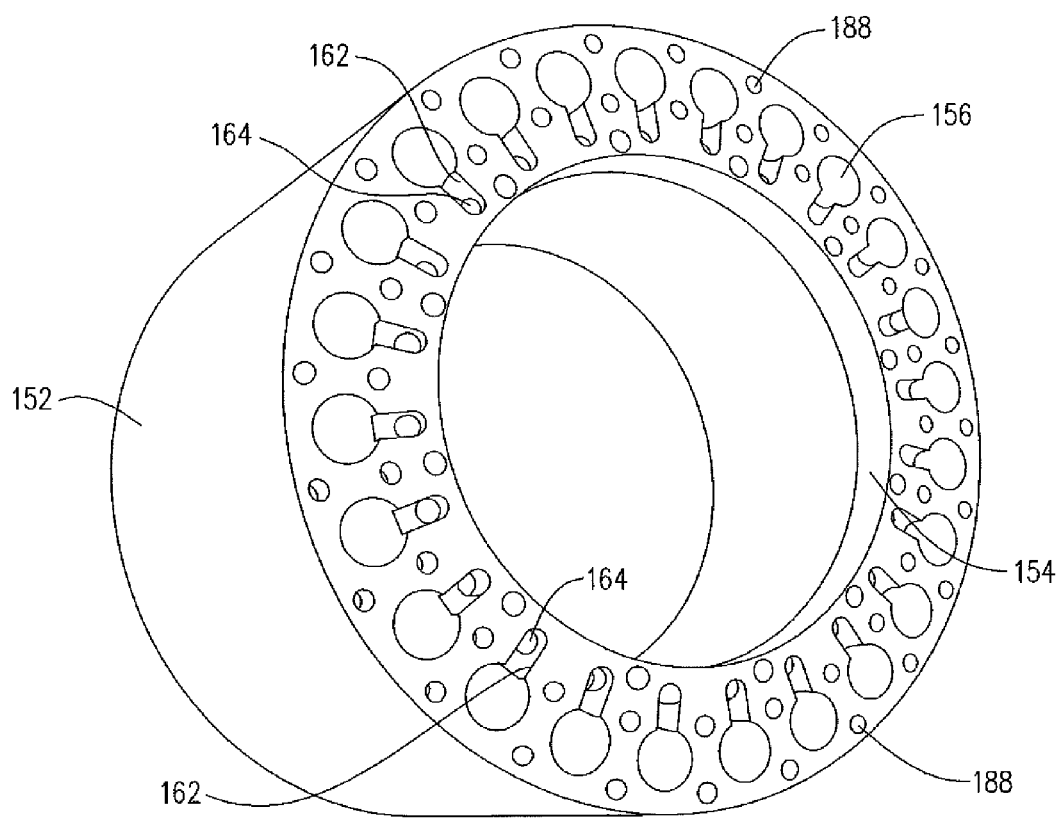
FIG. 20 is a right side perspective view of a shuttle drum.
Figure 21:
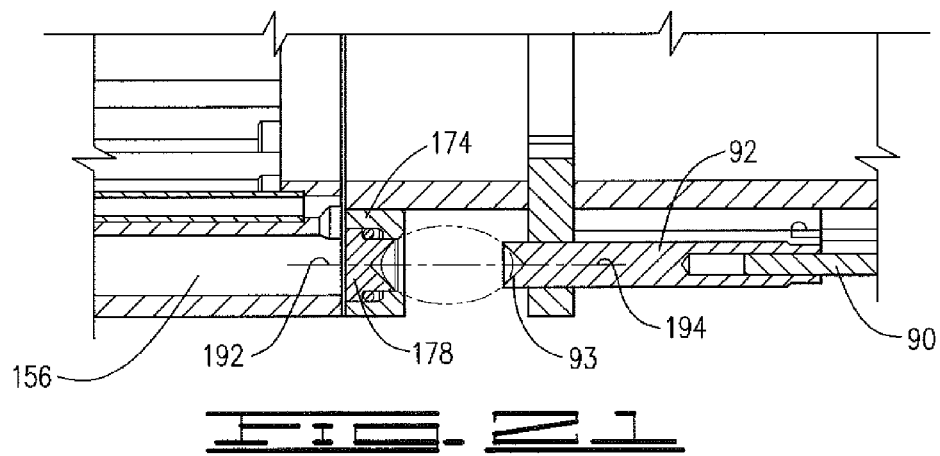
FIG. 21 is a cross section of a nut cracking unit.

Referring now to FIG. 18, the right side 458 of valve attachment plate 234 is shown. A plurality of bushings extend from right side 458 and include a feed bushing 460, a stress bushing 462, a release bushing 464, a crack bushing 466, a mounting bushing 468 and a reset bushing 470. Bushings 460, 462, 464, 466, 468 and 470 are preferably integrally formed as a part of valve attachment plate 234. As shown in FIGS. 14, 18 and 19, valve assembly 235, which may comprise first valve 236 and second valve 238 is received on bushings 460, 462, 464, 466, 468 and 470. Crack, mounting and reset bushing receptacles 476, 478 and 480 are defined in first valve 236 on a left side 481 thereof and will be closely received over crack, mounting and reset bushings 466, 468 and 470, respectively. Valve crack air slot 482 in first valve 236 will allow the passage of crack air therethrough. Valve crack air slot 482 may be configured to match slots 204 defined in valve plate 200. A valve reset air opening 484, which is smaller in diameter than bores 212 in valve plate 200 extends through valve 236 and will receive air communicated from valve cover 232 and valve attachment plate 234. Air will be communicated from reset air opening 484 through bores 212 in valve plate 200. First valve 236 has an engagement surface 486 which will engage the left side or left surface 210 of valve plate 200.

Second valve 238 has feed, stress and release bushing receptacles 488, 490 and 492 for receiving the feed, stress and release bushings 460, 462 and 464, respectively. Second valve 238 has valve feed and stress air slots 494 and 496, respectively, and has a valve release air opening 498. Second valve 238 has an engagement surface 500 which will engage the left side 10 of valve plate 200.

The operation of nut-cracking apparatus 10, which is apparent from the drawings and description herein, is detailed below. Air will be supplied to nut-cracking apparatus 10 by an air compressor (not shown). Air will be supplied to a manifold which will direct the air to regulators associated with the feed control knob 502, stress control knob 504, crack control knob 506, release control knob 508 and reset control knob 510. The air may pass through an air filter prior to entering the manifold and may pass through lubricators prior to entering valve cover plate 232 through hoses attached to the regulators and to the valve cover plate 232. Air supplied to the crack and reset openings 344 and 352 in valve cover plate 232 preferably passes through a lubricator and a regulator. Air to feed, stress and release openings 350, 348 and 346 is directed to the valve cover plate 232 from a regulator. The control knobs may be adjusted to supply the desired amount of air pressure such as for example 10 to 25 PSI for feed air, 10 to 25 PSI for stress air, 15 to 25 PSI for crack air, 25 to 35 PSI for release air and 7 to 12 PSI for reset air. Air is provided through hoses known in the art which will be connected to feed opening 350, stress opening 348, release opening 346, crack opening 344 and reset opening 352 in valve cover 232. Power will be supplied to motor 240 which will cause the rotation of turret sprocket 100 and turret 20 as described. Rotation of turret sprocket 100 will cause the rotation of forward chain sprocket 260 which will move endless conveyor 32. Valve plate 200 will rotate relative to valves 236 and 238.

Nuts are picked up by nut pockets 278 and carried from hopper 30 to pickup point 78. The carrying portion of endless conveyor 32 is horizontal, so that nuts are carried horizontally from the hopper 30 to pickup point 78, with no slopes or inclines. Singulator 284 may be utilized to adjust the effective width of each nut pocket 278 so that only one nut is carried lengthwise in each nut pocket 278 to the pickup point 78. Singulator or singulator assembly 284 comprises a singulator bracket 522 connected to center plate 52 with fasteners or other means known in the art. A singulator fitting 524 having a top plate 526 which may be referred to as singulator plate 526, a side wall 528 and a bottom plate 530 is pivotally mounted to singulator fitting 524. A singulator rod 532 extends through an opening 533 in singulator fitting 524. Singulator rod 532 is threaded and extends through a pair of threaded nuts 534 with a washer 536 sandwiched therebetween. Singulator fitting 524 will pivot about a pivot rod 538 which extends through opening 539 in singulator bracket 522 and opening 540 singulator plate 524. The rotation of singulator rod 532 with singulator knob 535 will cause singulator fitting 524 and thus, singulator plate 526 to rotate about pivot rod 538 to adjust the distance 540, which is the distance singulator plate 526 extends through center plate 52 into nut pocket singulator slot 283. Rotation in the clockwise direction will cause singulator plate 526 to move out of the slot 283 and counter clockwise motion will cause movement into slots 283, thus narrowing the effective width of nut pocket 278. As nuts are carried by the horizontal carrying portion of endless conveyor 32 in individual nut pockets 278, singulator 284 may be adjusted to insure that the effective width of each nut pocket provides for the carrying of only one nut lengthwise in each nut pocket 278.

First and second deflectors 322 and 324 will insure that nuts are not stacked upon each other in a nut pocket 278. Nuts will effectively rest and be aligned in each nut pocket 278 since there is a space 286 between each nut pocket 270 that allows for alignment and likewise allows any sediment and or fragments to pass through. When an embodiment with a vacuum system is utilized, air from beneath nut pocket segments 270 will be pulled through space 286 to hold a nut in an aligned cracking position in nut pocket 278. Nuts that fall onto hopper floor 56 are subject to the vibration of hopper floor 56 which will urge nuts toward endless conveyor 32 so that the nuts are easily fed into each nut pocket 278.

Nut cracking apparatus 10 will have been timed according in accordance with the discussion herein prior to operation. Pickup point 78 may be at about 3.18 degrees past bottom dead center. At pickup point 78 feed air is supplied through feed air opening 350 in valve cover 232 and valve attachment plate 234 as described. Feed air will exit through valve feed air slot 494 in valve 238. Air is supplied therethrough into opening 217 in valve plate 200. For the purposes of discussion the designation 217a will be used, along with usage of the subscript a on an aligned row of openings in valve plate 200. The subscript a usage is simply to allow the description of air flow for a cracking operation by nut cracking unit 25. Feed air is supplied to rear fitting 94 on air cylinder 80 so that piston 86 and piston rod 88 will be moved to engage a nut carried by nut pocket 278 and to hold the nut against crack die 178. As valve plate 200 continues to rotate stress air is supplied through valve stress air slot 496 in valve 238. Air supplied through valve stress air slot 496 is received from stress air opening 348 which supplies air communicated through valve cover 232 and valve attachment plate 234 as described herein. Air passes from valve stress air slot 496 through opening 217a in valve plate 200. The hose connected to fitting 219a will deliver the stress air to fitting 94, which will provide additional holding power between cylinder rod 88 and crack die 178. Stress air is applied at about 33.18 degrees past bottom dead center. Air is not allowed to escape after the feed air operation through opening 217a as valve plate 200 rotates since engagement surface 500 of second valve 238 will cover the opening 217a until the time it reaches valve stress air slot 496. As such, cracking unit 25 provides an efficient holding force that will prevent nuts from slipping to an improper or undesired cracking angle.

Crack air is provided through the crack air opening 344 in valve cover 232 and valve attachment plate 234 as described. Air is supplied through the valve crack air slot 476 in valve 236 to crack slot 204a in the rotating valve plate 200. Air is supplied through the crack slot 204a directly into the left end 158 of shuttle passage 156 which has shuttle 157 disposed therein. The air will urge shuttle 157 to the right so that it impacts crack die 178 with a force sufficient to crack the nut held between crack die 178 and cylinder rod 88. Engagement surface 486 will cover crack slot 204a, to prevent air from escaping during the cracking operation. Air in front of shuttle 157 will pass through connecting passage 162 into return air port 164 and return air passage 168 in return air pipe 166. Air will pass therethrough into accumulators 414 and 418 and through dump openings 457 into the dump or return air slot 398. Air received therein may pass into opening 404 and into hose 408. Oil in the air from lubricators may therefore be discharged through hose 408. The cracking operation will occur at approximately 51.18 degrees past bottom dead center. At about the same time the cracking occurs the feed/stress opening 217a in valve plate 200 will be uncovered. In other words, engagement surface 500 on second valve 238 will no longer cover opening 217a, so that when crack die 178 is impacted, the nut will not be overly cracked or crushed. Continued rotation of valve plate 200 will align release opening 216a with valve release air opening 498. Air is supplied to valve release air opening 498 from release air opening 346 in valve cover plate 232 and valve attachment plate 234 as described herein. Air will pass through release air opening 216a in valve plate 200 into fitting 218a which will have an air hose connected thereto that will be connected to fitting 95 at the left end of air cylinder 80. Air supplied therein will move piston 86 and piston rod 88 so as to prepare the air cylinder 80 to go through the cracking sequence again. The release operation occurs at about 66.18 degrees past bottom dead center. Finally, shuttle 157 is reset by the passage of air through valve reset air hole 484. Reset air is provided directly through opening 212a in valve plate 200 and passes through return air pipe 166, return air port 164 and connecting passage way 162 and urges shuttle 157 to its initial position at or near the rear end of 158 of shuttle passage 156 to prepare shuttle 157 for another cracking operation. Air to the left of shuttle 157 will pass through the space between valve plate 200 and valve attachment plate 234 and may pass into the openings 457 so that any oil in the air may be communicated into air hose 408. The reset operation occurs at about 5.10 degrees past bottom dead center. The feed, stress, crack, release and reset operations will occur in sequence for each of the twenty-four nut cracking units 25.

If after operation it is desirable to retime nut cracking apparatus 10, the timing operation as discussed herein provides for the simple and efficient timing of the nut cracking apparatus 10. If due to wear or other reasons it is desired to replace valves 236 and 238, the replacement operation is quick and efficient since it simply requires removing valve plate 232, pulling the valves 236 and 238 off of valve attachment plate 234 and replacing with new valves. This operation is a much quicker and efficient operation than was required with prior apparatus which call for more disassembly if valves are to be replaced. Prior apparatus required the disassembly of plates, and other components to remove and replace valves, and was a much more time consuming operation. Valves 236 and 238 are accessible and removable with minimal disassembly, namely, the removal of only one piece, valve plate 232.

Likewise if it is ever desired an replace a cylinder assembly 79 or a part thereof all that is necessary is the unthreading of a nut 104 from threaded fitting 96 and the cylinder assembly 79 may be pulled through the opening 106 in nut 104 and replaced as desired. With prior apparatus, the cylinder rod required disassembly, and in some cases the removal of plates is necessary. Cylinder assembly 79, along with cylinder rod 88 is removable simply by disconnecting the cylinder assembly 79 from turret sprocket 100, with no further disassembly required. Solid shuttle drum 15 which has a plurality of shuttle passages 156 therethough provides for an easier assembly since prior nut cracking apparatus utilized separate cylinders to define the shuttle passageways. Thus the machining and assembly operations for turret 20 are more efficient than with prior nut cracking apparatus.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A nut cracking apparatus for cracking nuts comprising:
   an endless conveyor comprising a plurality of spaced nut pocket segments, the nut pocket segments defining a plurality of nut pockets for delivering nuts to a pickup point wherein each nut pocket segment defines a portion of two adjacent nut pockets;
   a hopper for holding nuts to be delivered to the pickup point, the hopper comprising a vibrating hopper floor; and
   a plurality of nut cracking units for engaging nuts at the pickup point, wherein the nut pocket segments are spaced from one another and do not come into contact with one another as the endless conveyor carries the nuts to the pickup point; wherein the endless conveyor is horizontal from a delivery point at which the nut is received in a nut pocket to the pickup point wherein the cracking unit engages the nut in the nut pocket.

2. The nut cracking apparatus of claim 1 further comprising:
   a frame;
   a turret rotatably mounted to the frame, the turret comprising the plurality of nut cracking units; and
   a forward conveyor sprocket and a rear conveyor sprocket mounted to the frame, wherein the endless conveyor is carried by the forward conveyor sprocket and the rear conveyor sprocket, and the nut pocket segments do not contact one another at any time during the operation of the nut cracking apparatus.

3. The apparatus of claim 1, wherein the vibrating hopper floor moves nuts in a direction from a forward end to a rear end of the hopper.

4. A nut cracking apparatus for cracking nuts comprising:
   a frame;
   an endless conveyor mounted to the frame, the endless conveyor comprising a plurality of spaced nut pocket segments, the nut pocket segments defining a plurality of nut pockets for delivering nuts to a pickup point wherein each nut pocket segment defines a portion of two adjacent nut pockets;
   a plurality of nut cracking units for engaging nuts at the pickup point, wherein the nut pocket segments are spaced from one another and do not come into contact with one another as the endless conveyor carries the nuts to the pickup point; wherein the endless conveyor is horizontal from a delivery point at which the nut is received in a nut pocket to the pickup point wherein the cracking unit engages the nut in the nut pocket;
   a vacuum system for pulling air through the space between nut pocket segments to align nuts in the nut pockets, the vacuum system comprising:
     a vacuum pump;
     a vacuum manifold mounted to the frame for directing the air from the vacuum pump so that air is pulled through the space between nut pocket segments;

a hose mounted to the pump and the vacuum manifold; and a vacuum block positioned beneath the endless conveyor, wherein the vacuum manifold communicates with the vacuum block and pulls air therethrough.

5. The apparatus of claim 4, the frame comprising first and second side panels and a center panel therebetween, wherein the endless conveyor and vacuum block are positioned on a first side of the center panel, and the vacuum manifold is positioned on a second side of the center panel.

\* \* \* \* \*